(12) United States Patent
Yoneda et al.

(10) Patent No.: US 8,394,186 B2
(45) Date of Patent: Mar. 12, 2013

(54) PORPHYRAZINE COLORING MATTER, INK COMPOSITION AND COLORED PRODUCT

(75) Inventors: Takashi Yoneda, Tokyo (JP); Yasuo Kuroda, Tokyo (JP); Akira Kawaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 305 days.

(21) Appl. No.: 12/999,436

(22) PCT Filed: Jun. 26, 2009

(86) PCT No.: PCT/JP2009/002935
§ 371 (c)(1),
(2), (4) Date: Dec. 16, 2010

(87) PCT Pub. No.: WO2010/001559
PCT Pub. Date: Jan. 7, 2010

(65) Prior Publication Data
US 2011/0090278 A1    Apr. 21, 2011

(30) Foreign Application Priority Data

Jun. 30, 2008    (JP) ................................. 2008-170585

(51) Int. Cl.
C09D 11/02    (2006.01)
C09B 47/00    (2006.01)

(52) U.S. Cl. ..................... 106/31.47; 540/124; 540/125; 540/126

(58) Field of Classification Search ............... 106/31.47, 106/31.49; 540/124, 125, 126; 347/100; 428/195.1
See application file for complete search history.

(56) References Cited

U.S. PATENT DOCUMENTS

| | | | |
|---|---|---|---|
| 2,276,918 A | 3/1942 | Bienert et al. | |
| 3,622,263 A | 11/1971 | Groll et al. | |
| 4,952,688 A | 8/1990 | Springer | |
| 5,123,960 A | 6/1992 | Shirota et al. | |
| 5,279,622 A | 1/1994 | Stawitz et al. | |
| 5,847,111 A | 12/1998 | Wald et al. | |
| 5,922,116 A | 7/1999 | Mistry et al. | |
| 6,149,722 A | 11/2000 | Robertson et al. | |
| 6,190,422 B1 | 2/2001 | Carr | |
| 6,238,827 B1 | 5/2001 | Nakazawa et al. | |
| 6,379,441 B1 | 4/2002 | Kanaya et al. | |
| 6,569,212 B2 | 5/2003 | Carr | |
| 7,022,171 B2 | 4/2006 | Patel et al. | |
| 7,034,149 B2 | 4/2006 | Hirokazu et al. | |
| 7,097,701 B2 | 8/2006 | Tateishi et al. | |
| 7,132,012 B2 | 11/2006 | Tateishi et al. | |
| 7,160,372 B2 | 1/2007 | Yoshizawa et al. | |
| 7,270,701 B2 | 9/2007 | Jinnou et al. | |
| 7,282,090 B2 | 10/2007 | Osumi et al. | |
| 7,314,273 B2 | 1/2008 | Robertson et al. | |
| 7,419,537 B2 | 9/2008 | Fujii et al. | |
| 7,566,362 B2 | 7/2009 | Mori et al. | |
| 7,585,361 B2 | 9/2009 | Yoneda et al. | |
| 7,591,888 B2 | 9/2009 | Fujii et al. | |
| 7,611,571 B2 | 11/2009 | Yamashita et al. | |
| 7,854,797 B2 | 12/2010 | Fujii et al. | |
| 7,981,204 B2 | 7/2011 | Shimizu et al. | |
| 8,226,222 B2 * | 7/2012 | Kajiura et al. | 347/100 |
| 2002/0128249 A1 | 9/2002 | Cook | |
| 2004/0045478 A1 | 3/2004 | Tateishi et al. | |
| 2005/0126436 A1 | 6/2005 | Patel et al. | |
| 2006/0201382 A1 | 9/2006 | Ozawa et al. | |

(Continued)

FOREIGN PATENT DOCUMENTS

DE    728931 C    12/1942
DE    19521056 A1    12/1995

(Continued)

OTHER PUBLICATIONS

International Search Report dated Feb. 2, 2010 in co-pending foreign patent application PCT/JP2009/007094.

(Continued)

Primary Examiner — Helene Klemanski
(74) Attorney, Agent, or Firm — Nields, Lemack & Frame, LLC

(57) ABSTRACT

The present invention relates to a porphyrazine coloring matter represented by the following formula (1) or a salt thereof (wherein, the rings A to D are each independently a benzene ring or a 6-membered ring nitrogen-containing heteroaromatic ring, the number of said heteroaromatic rings is more than 0 and less than 1, E is alkylene, X is an anilino group or the like having at least one sulfo group or the like as a substituent, Y is a substituted monoalkylamino group or the like, b is 0 to 3, c is 0.1 to 3, and the sum of b and c is more than 3 and less than 4). By the present invention, a copper porphyrazine coloring matter suitable for inkjet recording which has a good hue as an cyan ink, is excellent in light fastness, ozone fastness and moisture fastness and does not cause bronze phenomenon can be provided.

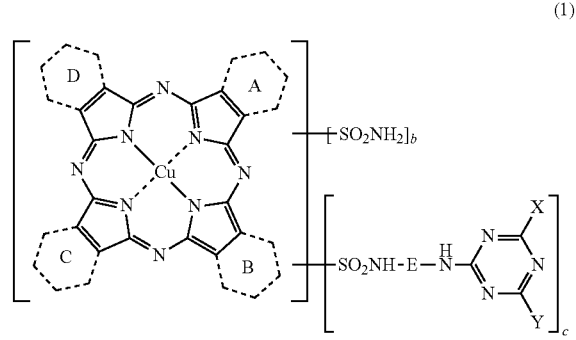

(1)

22 Claims, No Drawings

U.S. PATENT DOCUMENTS

| | | | |
|---|---|---|---|
| 2006/0268086 A1 | 11/2006 | Kawakami et al. | |
| 2007/0006772 A1 | 1/2007 | Fujii et al. | |
| 2008/0274286 A1 | 11/2008 | Yamashita et al. | |
| 2009/0029120 A1 | 1/2009 | Fujii et al. | |
| 2009/0047430 A1 | 2/2009 | Mori et al. | |
| 2009/0151599 A1 | 6/2009 | Fujii et al. | |
| 2009/0202798 A1 | 8/2009 | Patel | |
| 2010/0112218 A1 | 5/2010 | Fujii et al. | |
| 2010/0126377 A1 | 5/2010 | Yoneda et al. | |
| 2010/0236448 A1 | 9/2010 | Kurata et al. | |
| 2010/0279082 A1 | 11/2010 | Shimizu et al. | |
| 2011/0242198 A1 | 10/2011 | Yoneda et al. | |
| 2012/0013678 A1 | 1/2012 | Yoneda et al. | |
| 2012/0081457 A1* | 4/2012 | Ooshima et al. | 106/31.47 |

FOREIGN PATENT DOCUMENTS

| | | |
|---|---|---|
| EP | 0418792 A1 | 3/1991 |
| EP | 0669381 A2 | 8/1995 |
| EP | 0906943 A1 | 4/1999 |
| EP | 0985716 A1 | 3/2000 |
| EP | 1741756 A1 | 1/2007 |
| EP | 2028239 A1 | 2/2009 |
| GB | 2290548 A | 3/1996 |
| JP | 57-198758 A | 12/1982 |
| JP | 59-22967 A | 2/1984 |
| JP | 60-208365 A | 10/1985 |
| JP | 61-2772 A | 1/1986 |
| JP | 62-190273 A | 8/1987 |
| JP | 3-185080 A | 8/1991 |
| JP | 5-171085 A | 7/1993 |
| JP | 7-138511 A | 5/1995 |
| JP | 10-140063 A | 5/1998 |
| JP | 11-515048 A | 12/1999 |
| JP | 2000-303009 A | 10/2000 |
| JP | 2002-80762 A | 3/2002 |
| JP | 2002-105349 A | 4/2002 |
| JP | 2003-34758 A | 2/2003 |
| JP | 2004-075986 A | 3/2004 |
| JP | 2004-323605 A | 11/2004 |
| JP | 2006-45535 A | 2/2006 |
| JP | 2007-23251 A | 2/2007 |
| JP | 2007-277416 A | 10/2007 |
| JP | 2008-013706 A | 1/2008 |
| JP | 2009-057540 A | 3/2009 |
| JP | 2009-062515 A | 3/2009 |
| WO | 02/060994 A | 8/2002 |
| WO | 2004/087815 A1 | 10/2004 |
| WO | 2005/021658 A1 | 3/2005 |
| WO | 2007/091631 A1 | 8/2007 |
| WO | 2007/116933 A1 | 10/2007 |
| WO | 2008/111635 A1 | 9/2008 |
| WO | 2009/084195 A1 | 7/2009 |

OTHER PUBLICATIONS

International Search Report dated May 18, 2010 in co-pending foreign application No. PCT/JP2010/002700.

International Search Report dated May 18, 2004 in co-pending foreign application PCT/JP2004/004446

Supplemental European Search Report dated May 30, 2007 in co-pending foreign application EP04724180.

International Search Report dated May 15, 2007 in co-pending foreign application PCT/JP2007/052212.

International Search Report dated Jul. 10, 2007 in co-pending foreign application PCT/JP2007/047651.

International Search Report dated Apr. 22, 2008 in co-pending foreign application PCT/JP2008/054584.

International Search Report dated Mar. 17, 2009 in co-pending foreign application PCT/JP2008/003947.

International Search Report dated Sep. 15, 2009 in corresponding foreign application PCT/JP2009/002935.

XP-002435570; J.R. Schweizer; May 19, 1964; Farbstoffe; "Cyclo-tetraisoindolenin-(endo-isoindolenino)-Komplex":, pp. 510-511.

XP-002435574; DataBase WPI Week 198608; Jan. 8, 1986; Derwent Publications Ltd.; "Ink Composition Blue Colour Low Water Soluble comprise Sulphonated Copper Phthalo Cyanine Derivative Web Agent"; 1-Page.

XP-002435575; DataBase WPI Week 198548; Oct. 19, 1985; Derwent Publications Ltd.; Copper Phthalocyanine Compound Preparation React Chlorosulphonic Acid Ammonium Hydroxide Triazine Derivative; 1 Page.

XP-002435576; DataBase WPI Week 198303; Dec. 6, 1982; Derwent Publications Ltd.; "Water Soluble Phthalocyanine Dye Low Affinity Cellulose Fast Washing Textile Print" 1-Page.

Office Action dated Dec. 23, 2010 in co-pending U.S. Appl. No. 12/810,376, filed Jun. 24, 2010.

Notice of Allowance dated May 20, 2011 in co-pending U.S. Appl. No. 12/810,376.

* cited by examiner

PORPHYRAZINE COLORING MATTER, INK COMPOSITION AND COLORED PRODUCT

TECHNICAL FIELD

The present invention relates to a copper porphyrazine coloring matter, an ink composition containing said coloring matter, and colored product colored therewith.

BACKGROUND ART

Recently, as an image recording material, the materials to form color images are the mainstream. Specifically, these materials can include recording materials to be used for the inkjet method, image recording materials for thermal transfer, recording materials to be used for the electrophotographic method, halogenated silver photosensitive materials for transcription, and the like. In addition, printing inks and inks for recording pens are also actively used as one of the recording materials.

Further, in displays such as LCD (liquid crystal display) and PDP (plasma display panel), electronic parts such as CCD (charge coupled device) in photographing equipments, and the like, a color filter is used for forming color images. In them, coloring matters (dye or pigment) of 3 primary colors in so-called additive color process and subtractive color process are used for reproducing or recording fullcolor images. Actually, however, there is no coloring matter having absorption characteristics allowing reproduction of a desired color range and sufficient fastnesses in various use conditions, and improvement thereof is strongly required.

The inkjet recording method has been rapidly prevailing and further developing due to its low material cost, possibility of rapid recording, less noise in recording and also easiness of color recording. The inkjet recording method includes the continuous method of continuously flying ink droplets and the on-demand method of flying ink droplets responding to an image information signal. The discharging method includes a method of discharging ink droplets by applying pressure with piezoelectric elements; a method of discharging ink droplets by generating bubbles in ink by heat; a method by using ultrasonic waves; a method of sucking and discharging ink droplets by electrostatic force; or the like. In addition, examples of the ink suitable for inkjet recording include water-based inks, oil-based inks, solid (melting-type) inks and the like.

The requirements for the coloring matter contained in inks suitable for such inkjet recording are good solubility or dispersibility in solvents; ability of high density recording; good hue; good fastness to light, heat and active gases (oxidizing gas such as NOx or ozone, SOx and the like) in the environment, excellent durability against water and chemicals, good fixation to record-receiving materials in order not to bleed, excellent storage stability as an ink, no toxicity, and also inexpensive availability, and the like. In particular, strongly required is a cyan coloring matter which has a good cyan hue, is excellent in light fastness (durability against light), ozone fastness (durability against ozone gas) and moisture fastness (durability under high humidity) and water fastness (durability against water), and causes no bronze phenomenon (also referred to as bronzing phenomenon). Bronze phenomenon means glare phenomenon that glossy paper has a metallic luster because coloring matter is aggregated on its surface due to association and aggregation of coloring matter, malabsorption of ink to the media, or the like. This phenomenon leads to inferiority of recorded image quality in all respects such as glossiness, print quality and print density.

As a water-soluble cyan coloring matter used for inks suitable for inkjet recording, a phthalocyanine-based coloring matter and a triphenylmethane-based coloring matter are typical. The typical phthalocyanine-based coloring matter reported and used in the widest range includes phthalocyanine derivatives classified into the following A to H:

A: known phthalocyanine-based coloring matter such as Direct Blue 86, Direct Blue 87, Direct Blue 199, Acid Blue 249, Reactive Blue 71 or the like;
B: phthalocyanine-based coloring matter described in Patent Literatures 1 to 3 and the like (for example, a mixture of Cu-Pc-$(SO_3Na)m(SO_2NH_2)n$: m+n=1 to 4);
C: phthalocyanine-based coloring matter described in Patent Literature 4 and the like (for example, Cu-Pc-$(CO_2H)m$ $(CONR_1R_2)n$: m+n=a number of 0 to 4);
D: phthalocyanine-based coloring matter described in Patent Literature 5 and the like (for example, Cu-Pc-$(SO_3H)m$ $(SO_2NR_1R_2)n$: m+n=a number of 0 to 4, and m≠0);
E: phthalocyanine-based coloring matter described in Patent Literature 6 and the like (for example, Cu-Pc-$(SO_3H)l$ $(SO_2NH_2)m(SO_2NR_1R_2)n$: l+m+n=a number of 0 to 4);
F: phthalocyanine-based coloring matter described in Patent Literature 7 and the like (for example, Cu-Pc-$(SO_2NR_1R_2)$ n: n=a number of 1 to 5);
G: phthalocyanine-based coloring matter described in Patent Literatures 8, 9 and 12 and the like (phthalocyanine compound in which the substitution position of the substituent is controlled and phthalocyanine-based coloring matter in which a substituent is introduced at the beta-position);
H: benzo pyridoporphyrazine-based coloring matter having a pyridine ring and a benzene ring, described in Patent Literatures 10, 13, 14, 15, 16 and the like.

The phthalocyanine-based coloring matter typified by Direct Blue 86 or Direct Blue 199 which are usually used widely at present has a characteristic of being excellent in light fastness compared with magenta coloring matters and yellow coloring matters which are generally known. However, the phthalocyanine-based coloring matter has a greenish hue under acidic conditions, whereby it is not very preferable as a cyan ink. Therefore, it is preferable that these coloring matters are used under neutral to alkaline conditions when used as a cyan ink. However, although the ink to be used is neutral to alkaline, the hue of a printed matter may be greatly changed when the record-receiving material to be used is an acidic paper.

In addition, there has been a problem that when the phthalocyanine-based coloring matter is used as a cyan ink, the hue of a printed matter is discolored greenish and also color fading occurs due to oxidizing gases such as nitrogen oxide gas and ozone which are often concerned nowadays as an environmental problem, whereby the print density is concurrently reduced.

On the other hand, the triphenylmethane-based coloring matter has a good hue but is very inferior in light fastness, ozone fastness and moisture fastness.

From here on, as the application field of inkjet recording is expanded and inkjet recording is widely used in articles on exhibition for advertisement and the like, there will be more opportunities for coloring matter and ink to be exposed to light and active gases in the environment, whereby the coloring matter and the ink used there will be more and more strongly required to have a good hue and to be inexpensive, and further, in particular to have a good hue and to be excellent in light fastness, fastness to active gases in the environment (oxidizing gases such as NOx, ozone and in addition SOx, and the like) and moisture fastness because they will be more often exposed to light and active gases in the environment. However, it is difficult to develop a cyan coloring matter (for example, phthalocyanine-based coloring matter) and a cyan ink which satisfy these requirements at a high level.

In the past, although phthalocyanine-based coloring matters to which fastness to active gases is imparted are disclosed in Patent Literatures 3, 8 to 12, and 14 to 16, and the like, a cyan coloring matter and a cyan ink have not yet been obtained which satisfy all the qualities such as hue, light fastness, ozone fastness, moisture fastness and no bronze phenomenon, and further which can be produced inexpensively. Therefore, the requirements of the market have not been sufficiently satisfied.

Patent Literature 1: JP S62-190273 A
Patent Literature 2: JP H7-138511 A
Patent Literature 3: JP 2002-105349 A
Patent Literature 4: JP H5-171085 A
Patent Literature 5: JP H10-140063 A
Patent Literature 6: JP H11-515048 A
Patent Literature 7: JP S59-22967 A
Patent Literature 8: JP 2000-303009 A
Patent Literature 9: JP 2002-249677 A
Patent Literature 10: JP 2003-34758 A
Patent Literature 11: JP 2002-80762 A
Patent Literature 12: WO 2004/087815 A1
Patent Literature 13: WO 2002/034844 A1
Patent Literature 14: JP 2004-75986 A
Patent Literature 14: WO 2007/091631 A1
Patent Literature 14: WO 2007/116933 A1

DISCLOSURE OF THE INVENTION

Problems to Be Solved by the Invention

It is an object of the present invention to solve the above problems and provide a novel coloring matter having a good hue as a cyan ink, being excellent in various fastnesses such as light fastness, ozone fastness, moisture fastness and water fastness, and causing no bronze phenomenon, and to further provide an ink composition suitable for inkjet by using said coloring matter and an inkjet recording method using said ink composition.

Means of Solving the Problems

The present inventors have intensively studied and found that a porphyrazine coloring matter represented by the following formula (1) having, as an average value, more than 0 and less than 1 of the nitrogen-containing heteroaromatic ring in the porphyrazine ring and being substituted with a particular sulfamoyl can solve the above problems, and the present invention has been completed. That is, the present invention relates to:

(1)
A porphyrazine coloring matter represented by the following formula (1) or a salt thereof:

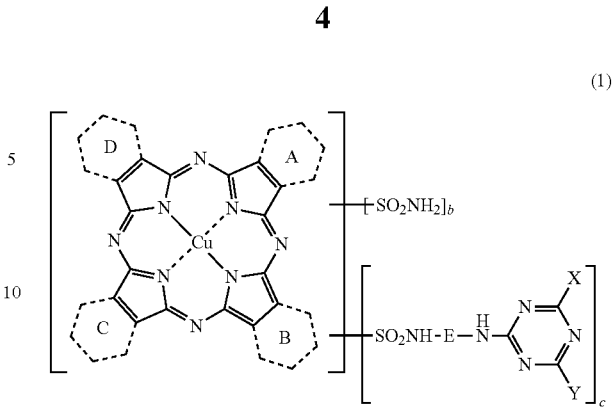

[wherein:
the rings A to D each independently represent a benzene ring or a 6-membered ring nitrogen-containing heteroaromatic ring fused to the porphyrazine ring, the number of the nitrogen-containing heteroaromatic rings in the rings A to D is more than 0.00 and less than 1.00 as an average value, and the rest are benzene rings, E represents alkylene, X is an anilino group or a naphthylamino group having, as a substituent, at least one group selected from the group consisting of a sulfo group, a carboxy group and a phosphono group, and said anilino or naphthylamino group may be further substituted with at least one group selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group, Y represents an amino group; a hydroxy group; a mono- or dialkylamino group or a nitrogen-containing heterocyclic group which may have 1 kind or 2 or more kind substituents selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group, for the combination of X and Y, a combination where Y is an amino group or a hydroxy group and X is a substituted anilino group is not included, b represents the substitution number of the unsubstituted sulfamoyl group and is 0.00 or more and less than 3.90 as an average value, c represents the substitution number of the substituted sulfamoyl group and is 0.10 or more and less than 4.00 as an average value, and the sum of b and c is more than 3.00 and less than 4.00 as an average value], (2)
The porphyrazine coloring matter or a salt thereof according to the above (1), wherein in the formula (1) described in the above (1), the 6-membered ring nitrogen-containing heteroaromatic ring represented by the ring A to D is a pyridine ring or a pyrazine ring, (3)
The porphyrazine coloring matter or a salt thereof according to the above (1) or (2), which is obtained by reaction of a porphyrazine compound represented by the following formula (3) with an organic amine represented by the following formula (4) in the presence of ammonia:

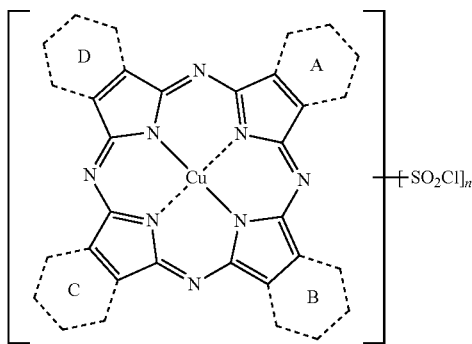

(3)

[wherein, the rings A to D have the same meanings as those described in the above (1), and n is more than 3 and less than 4]

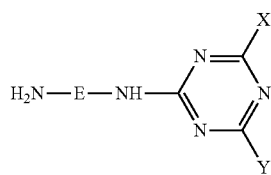

(4)

[wherein, E, X and Y have the same meanings as those described in the above (1)], (4)
The porphyrazine coloring matter or a salt thereof according to any one of the above (1) to (3), wherein:
the 6-membered ring nitrogen-containing heteroaromatic ring in the rings A to D is a pyridine ring and the ring-fusion positions of said pyridine ring are the 2- and 3-positions, the 3- and 4-positions, the 4- and 5-positions or the 5- and 6-positions when the nitrogen atom of the pyridine ring is at the 1-position, or
the 6-membered ring nitrogen-containing heteroaromatic ring in the rings A to D is a pyrazine ring and the ring-fusion positions of said pyrazine ring are the 2- and 3-positions when the nitrogen atoms of the pyrazine ring are at the 1- and 4-positions, E is C2-C4 alkylene,
X is an anilino group or an naphthylamino group having, as a substituent, a sulfo group, a carboxy group or a phosphono group, and said anilino or naphthylamino group may further have 0 to 3 substituents of 1 kind or 2 or more kinds selected from the group consisting of a sulfo group, a carboxy group, a phosphono group, a hydroxy group, an alkoxy group, an ureide group, an acetylamino group, a nitro group and a chlorine atom,
Y is an amino group; a hydroxy group; or a mono- or di C1-C4 alkylamino group or a 5 to 7 membered nitrogen-containing heterocyclic group which may be substituted with a group selected from the group consisting of a hydroxy group, a sulfo group, a carboxy group or a phosphono group, and a combination where Y is an amino group or a hydroxy group and X is a substituted anilino group is not included,
(5)
The porphyrazine coloring matter or a salt thereof according to any one of the above (1) to (4), wherein:
the number of 6-membered ring nitrogen-containing heteroaromatic rings in the rings A to D is 0.20 to 0.90 as an average value and the rest are benzene rings,
b is 0.00 to 3.70 as an average value,
c is 0.10 to 3.80 as an average value, and
the sum of b and c is 3.10 to 3.80 as an average value,
(6)
The porphyrazine coloring matter or a salt thereof according to any one of the above (1) to (5), wherein:
the number of 6-membered ring nitrogen-containing heteroaromatic rings in the rings A to D is 0.25 to 0.85 as an average value,
E represents C2-C4 alkylene,
X is an anilino group or a naphthylamino group substituted with a sulfo group or a carboxy group; or a phosphoric acid-substituted anilino group, and said anilino and naphthylamino groups may also have 0 to 3 substituents of 1 kind or 2 or more kinds selected from the group consisting of a sulfo group, a carboxy group, a phosphono group, a hydroxy group, an alkoxy group, an ureide group, an acetylamino group, a nitro group and a chlorine atom,
Y is an amino group; a hydroxy group; a mono- or dialkylamino group or a nitrogen-containing heterocyclic group which may be substituted with a group selected from the group consisting of a hydroxy group, a sulfo group, a carboxy group or a phosphono group,
b is 0.00 to 3.65 as an average value,
c is 0.10 to 3.75 as an average value, and
the sum of b and c is 3.15 to 3.75 as an average value,
(7)
The porphyrazine coloring matter or a salt thereof according to any one of the above (1) to (6), wherein:
E is ethylene or propylene,
X is a sulfo-substituted anilino group; a carboxy-substituted anilino group; or a sulfo-substituted naphthylamino group, and
Y is an amino group; a hydroxy group; a mono- or dialkylamino group or a nitrogen-containing heterocyclic group which may be substituted with a hydroxy group, a sulfo group, or a carboxy group,
(8)
The porphyrazine coloring matter or a salt thereof according to the above (7), wherein the 6-membered ring nitrogen-containing heteroaromatic ring in the rings A to D is a pyridine ring and the ring-fusion positions of said pyridine ring are the 2- and 3-positions or the 5- and 6-positions when the nitrogen atom of the pyridine ring is at the 1-position,
(9)
An ink composition characterized by containing the porphyrazine coloring matter or a salt thereof according to any one of the above (1) to (8) as a coloring matter and further containing water,
(10)
The ink composition according to the above (9), which further contains an organic solvent,
(11)
The ink composition according to the above (9) or (10), which is for inkjet recording, (12)

An inkjet recording method where recording is performed by discharging an ink droplet of the ink composition containing the porphyrazine coloring matter or a salt thereof according to any one of the above (1) to (8) and water in response to a recording signal to adhere on a record-receiving material, (13)

The inkjet recording method according to the above (12), wherein the record-receiving material is a communication sheet, (14)

The inkjet recording method according to the above (13), wherein the communication sheet is a sheet which is subjected to surface treatment and has an ink receiving layer containing white inorganic pigment particles on the support thereof, (15)

A container filled with an ink composition containing the porphyrazine coloring matter or a salt thereof according to any one of the above (1) to (8) and water, (16)

An inkjet printer comprising the container according to the above (15), (17)

A colored product colored with an ink composition containing the porphyrazine coloring matter or a salt thereof according to any one of the above (1) to (8) and water, (18)

The porphyrazine coloring matter or a salt thereof according to the above (1), wherein:

the 6-membered ring nitrogen-containing heteroaromatic ring in the rings A to D is a pyridine ring or a pyrazine ring, E is a C2-C4 alkylene group, X is a sulfo-substituted anilino group, a carboxy-substituted anilino group or a sulfo-substituted naphthylamino group, and Y is an amino group; a hydroxy group; a mono(C1-C4)alkylamino group which may be substituted with a group selected from the group consisting of a sulfo group, a carboxy group, a hydroxy group and an alkoxy group; a di(C1-C4)alkylamino group which may be substituted with a carboxy group or a hydroxy group; or a 5 to 6-membered ring nitrogen-containing heterocyclic group which may be substituted with a methyl group, an ethyl group or a carboxy group, (19)

The porphyrazine coloring matter or a salt thereof according to the above (1), wherein:

the 6-membered ring nitrogen-containing heteroaromatic ring in the rings A to D is a pyridine ring, the ring-fusion positions of said pyridine ring are the 2- and 3-positions when the nitrogen atom of the pyridine ring is at the 1-position, and the number of said pyridine rings is 0.2 to less than 1 as an average value, E is an ethylene group, X is a sulfo-substituted anilino group, and Y is a sulfo C1-C4 alkylamino group, (20)

A porphyrazine coloring matter represented by the following formula (1') or a salt thereof:

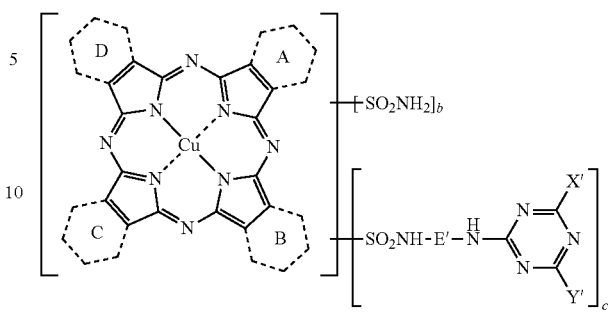

(1')

(wherein:

the rings A to D each independently represent a benzene ring or a 6-membered ring nitrogen-containing heteroaromatic ring fused to the porphyrazine ring, the number of the nitrogen-containing heteroaromatic rings in the rings A to D is more than 0 and less than 1 as an average value, and the rest are benzene rings, E' represents C2-C4 alkylene, X' is a sulfo-substituted anilino group; a carboxy-substituted anilino group; or a sulfo-substituted naphthylamino group, Y' is an amino group; a hydroxy group; a mono- or dialkylamino group which may have, as a substituent, a hydroxy group, a sulfo group or a carboxy group on the alkyl group; or a 5 to 6-membered ring nitrogen-containing heterocyclic group which may have, as a substituent, a C1 to C3 alkyl group or a carboxy group, b is 0 or more and less than 3.9 as an average value, c is 0.1 or more and less than 4 as an average value, and the sum of b and c is more than 3 and less than 4 as an average value), (21)

The porphyrazine coloring matter or a salt thereof according to the above (20), wherein the 6-membered ring nitrogen-containing heteroaromatic ring is a pyridine ring, X' is a sulfo-substituted anilino group, and Y' is a sulfo-substituted C1-C4 alkylamino group, (22)

The porphyrazine coloring matter or a salt thereof according to the above (20) or (21), wherein:

the number of pyridine rings is 0.1 to less than 1 as an average value, and b and c fulfill the following relations:

$$1.8 < b \leq 3.7,$$

$$0.2 \leq c \leq 1.2, \text{ and}$$

$$3 < b+c \leq 3.9$$

as an average value.

Effect of the Invention

The ink composition containing the coloring matter of the present invention or a salt thereof is an ink composition having a good hue as a cyan ink and being excellent in light fastness, ozone fastness, moisture fastness and water fastness. In addition, it has no solid precipitation, no changes in physical properties, no color changes nor the like after storage for a long period of time and thus has a good storage stability. Further, it can provide colors in a wide visible region of tones by using with other magenta and yellow inks. Therefore, the cyan ink composition containing the porphyrazine coloring matter of the present invention or a salt thereof is extremely useful as an ink for inkjet recording.

BEST MODE FOR CARRYING OUT THE INVENTION

The present invention will be more specifically explained.

The porphyrazine coloring matter represented by the above formula (1) or the above formula (1') of the present invention or a salt thereof is suitable as a coloring matter for inkjet recording. And the ink suitable for inkjet recording of the present invention is characterized by containing the porphyrazine coloring matter represented by the above formula (1) or the above formula (1') or a salt thereof.

In addition, said coloring matter is a coloring matter where an unsubstituted sulfamoyl group and a particular substituted sulfamoyl group are introduced into porphyrazine in which more than 0 and under 1 benzene ring as an average value among the 4 benzo(benzene) rings of the copper tetrabenzoporphyrazine (which is one usually referred to as copper phthalocyanine) is replaced by a 6-membered nitrogen-containing heteroaromatic ring; said copper porphyrazine coloring matter or a salt thereof has a high water-solubility and is very suitable for ink for inkjet and excellent in storage stability; and the recorded matter with an ink containing said coloring matter or a salt thereof is extremely excellent in fastness to ozone gas, hardly causes bronze phenomenon and has a good water fastness.

In this regard, "porphyrazine coloring matter of the present invention or a salt thereof" is hereinafter referred to, unless otherwise specifically noted, as "porphyrazine coloring matter of the present invention" for simplicity in the present description in order to avoid complication of description.

In the above formula (1) or the above formula (1'), the rings A to D each independently represent a benzene ring or a 6-membered ring nitrogen-containing heteroaromatic ring fused to the porphyrazine ring, the number of nitrogen-containing heteroaromatic rings is more than 0 and less than 1 as an average value and the rest are benzene rings.

The 6-membered ring nitrogen-containing heteroaromatic ring in the rings A to D includes, for example, a nitrogen-containing heteroaromatic ring containing 1 to 2 nitrogen atoms, such as a pyridine ring, a pyrazine ring, a pyrimidine ring and/or a pyridazine ring. Among them, a pyridine ring or a pyrazine ring is preferable and a pyridine ring is most preferable.

As the number of said nitrogen-containing heteroaromatic rings is increased, ozone fastness is improved but bronzing is apt to occur, and thus the number of the nitrogen-containing heteroaromatic rings may be appropriately controlled in view of ozone fastness and bronzing properties to select a balanced ratio thereof. The number of the nitrogen-containing heteroaromatic rings depends on the kind of heterocyclic ring and cannot be generally suggested, but it is, as an average value, usually more than 0 and less than 1, preferably 0.1 to less than 1 and more preferably 0.2 to less than 1. In addition, the number of the nitrogen-containing heteroaromatic rings may be in the range of 0.01 to 0.99, more preferably 0.10 to 0.90, further preferably 0.20 to 0.90 and most preferably 0.2 to 0.85 or 0.25 to 0.85. The rest of the rings A to D are benzene rings.

The porphyrazine coloring matter of the present invention is a mixture of a plurality of coloring matters as is clear from that the number of nitrogen-containing heterocyclic rings of the rings A to D is represented as an average value. More specifically, the coloring matter of the present invention is a mixture of a porphyrazine coloring matter where all of the rings A to D are benzene rings and a porphyrazine coloring matter where one or more of the rings A to D are 6-membered ring nitrogen-containing heteroaromatic rings, so the average number of benzene rings and the average number of 6-membered ring nitrogen-containing heteroaromatic rings in the mixture is shown by using numbers under 1 or numbers which are not integers. For example, when the number of 6-membered ring nitrogen-containing heteroaromatic rings is more than 0 and under 1, it means that a porphyrazine coloring matter where all the rings A to D are benzene rings and a porphyrazine coloring matter where one (main component) or more of the rings A to D are 6-membered ring nitrogen-containing heteroaromatic rings are mixed in the range of the above values as an average value. In the present invention, there is no problem in handling it as a compound with an average value and thus it is described so.

In this regard, in the present description, the number of said nitrogen-containing heteroaromatic rings is, according to necessity, shown to the second decimal place by rounding the number in the third decimal place.

Alkylene for E in the above formula (1) includes, for example, C2-C12 alkylene, preferably C2-C6 alkylene and more preferably C2-C4 alkylene. Specific examples thereof include ethylene, propylene, butylene, pentylene, hexylene, cyclopropylenediyl, 1,2- or 1,3-cyclopentylenediyl, 1,2-, 1,3- or 1,4-cyclohexylenediyl and the like. E in the above formula (1) is preferably ethylene, propylene or butylene, more preferably ethylene or propylene and further preferably ethylene.

X is an anilino group or a naphthylamino group having, as a substituent on the benzene ring or the naphthalene ring, at least one group selected from the group consisting of a sulfo group, a carboxy group and a phosphono group, and it preferably has 1 to 2 substituents and more preferably 1 substituent on benzene ring and 1 to 3 substituents and preferably 1 to 2 substituents on the naphthalene ring, the substituents being selected from the above. Among them, a sulfo group or a carboxy group is more preferable and a sulfo group is most preferable.

Said anilino group or said naphthylamino group may be further substituted with 1 kind or 2 or more kinds of groups selected from the group consisting of a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group, as a substituent other than the above on benzene ring or the naphthalene ring. It is preferred to have 0 to 2 and more preferably 0 of these substituents on the benzene ring and 0 to 2 and preferably 0 of these substituents on the naphthalene ring.

The substituents on the benzene ring or the naphthalene ring in X described above will be explained below.

For the alkoxy group, the alkyl moiety thereof may be any of straight-chain, branched-chain or cyclic, preferably straight-chain or branched-chain and more preferably straight-chain. Said alkoxy group can usually include a (C1-C6) alkoxy group, preferably a (C1-C4) alkoxy group and more preferably a (C1-C3) alkoxy group. Specific examples of said alkoxy group include a straight-chain alkoxy group such as methoxy, ethoxy, n-propoxy, n-butoxy, n-pentoxy and n-hexyloxy; a branched-chain alkoxy group such as isopropoxy, isobutoxy, t-butoxy, isopentoxy(isoamyloxy) and isohexyloxy; a cyclic alkoxy group such as cyclopropoxy, cyclobutoxy, cyclopentoxy and cyclohexyloxy; and the like.

For the mono- or dialkylamino group, the alkyl moiety thereof may be either straight-chain or branched-chain. The number of carbon atoms in the alkyl moiety is usually C1-C6, preferably C1-C4 and more preferably C1-C3. In the case of the dialkylamino group, both the alkyl groups may be straight-chain or branched-chain, otherwise either thereof may be straight-chain and the other may be branched-chain.

Specific examples of said mono- or dialkylamino group include a straight-chain monoalkylamino group such as methylamino, ethylamino, n-propylamino, n-butylamino, n-pentylamino and n-hexylamino; a branched-chain monoalkylamino group such as isopropylamino, isobutylamino, isopentylamino and isohexylamino; a straight-chain dialkylamino group such as dimethylamino, diethylamino, di(n-propyl)amino, di(n-butyl)amino, di(n-pentyl)amino and di(n-hexyl)amino; a branched-chain dialkylamino group such as diisopropylamino, diisobutylamino, diisopentylamino and diisohexylamino; a dialkylamino group where both the alkyl chains are deferent from each other, such as methyl(ethyl)amino, methyl(n-propyl)amino and methyl(isopropyl)amino; and the like.

As the mono- or diarylamino group, a mono- or di C6-C10 aryl amino group is preferable and a mono- or diphenylamino group is more preferable.

The alkyl group includes a straight-chain or branched-chain alkyl group and is preferably a straight-chain alkyl group. The number of carbon atoms in said alkyl group is usually C1-C6, preferably C1-C4 and more preferably C1-C3. Specific examples thereof include a straight-chain alkyl group such as methyl, ethyl, n-propyl, n-butyl, n-pentyl and n-hexyl; a branched-chain alkyl group such as isopropyl, isobutyl, sec-butyl, t-butyl, isopentyl, 2-methylbutyl and isohexyl; and the like.

The halogen atom includes a fluorine atom, a chlorine atom, a bromine atom and an iodine atom and is preferably a chlorine atom or a bromine atom and more preferably a chlorine atom.

For the alkylsulfonyl group, the alkyl moiety thereof may be any of straight-chain or branched-chain and preferably straight-chain. The number of carbon atoms in said alkyl moiety is usually C1-C6, preferably C1-C4 and more preferably C1-C3. Specific examples of said alkylsulfonyl group include a straight-chain alkylsulfonyl group such as methylsulfonyl, ethylsulfonyl, n-propylsulfonyl, n-butylsulfonyl, n-pentylsulfonyl and n-hexylsulfonyl; a branched-chain alkylsulfonyl group such as isopropylsulfonyl, isobutylsulfonyl, sec-butylsulfonyl, t-butylsulfonyl, isopentylsulfonyl, 2-methylbutylsulfonyl and isohexylsulfonyl; and the like.

For the alkylthio group, the alkyl moiety thereof may be any of straight-chain or branched-chain and preferably straight-chain. The number of carbon atoms in said alkyl group is usually C1-C6, preferably C1-C4 and more preferably C1-C3. Specific examples of said alkylthio group include a straight-chain alkylthio group such as methylthio, ethylthio, n-propylthio, n-butylthio, n-pentylthio and n-hexylthio; a branched-chain alkylthio group such as isopropylthio, isobutylthio, sec-butylthio, t-butylthio, isopentylthio, 2-methylbutylthio and isohexylthio; and the like.

As the aryloxy group, a C6-C10 aryloxy group is preferable, phenoxy or naphthyloxy is more preferable, and phenoxy is further preferable.

The heterocyclic group includes an aromatic heterocyclic group or an aliphatic heterocyclic group containing a nitrogen atom, and it is preferably an aliphatic heterocyclic group bonded to a benzene ring or a naphthalene ring at said nitrogen atom.

Said aromatic heterocyclic group includes a 6-membered ring one containing 1 or 2 nitrogen atoms, and specific examples thereof include a pyridine group, a pyrazine group, a pyrimidine group, a pyridazine group and the like.

Said aliphatic heterocyclic group includes a 5 or 6-membered ring one which contains one nitrogen atom and may further contain one oxygen atom or one nitrogen atom. In addition, said aliphatic heterocyclic group may have a C1-C4 alkyl group or a carboxy group as a substituent. Specific examples of said aliphatic heterocyclic group include a group bonded to a benzene ring or a naphthalene ring at the nitrogen atom, such as morpholin-1-yl, 4-methyl-piperidin-1-yl, piperidin-1-yl, pyrrolidin-1-yl, 2-carboxy-pyrrolidin-1-yl and 4-ethyl-piperazin-1-yl.

Next, X will be more specifically explained.

As is described above, X is an anilino group or a naphthylamino group having, as a substituent, at least one group selected from the group consisting of a sulfo group, a carboxy group and a phosphono group on the benzene ring or the naphthalene ring; and when X is an anilino group or a naphthylamino group having, as a substituent, a sulfo group, a carboxy group or a phosphono group, the substituent which it may further have can include at least one group selected from the group consisting of a sulfo group, a carboxy group, a phosphono group, a hydroxy group, an alkoxy group, an ureide group, an acetylamino group, a nitro group and a halogen atom (more preferably a chlorine atom), and more preferably a sulfo group, a carboxy group and a hydroxy group. In addition, when X is said naphthylamino group, a sulfo group and a hydroxy group are further preferable among the above substituents which it may further have.

The number of the substituents which said anilino group or said naphthylamino group further has is usually 0 to 4, preferably 0 to 3, more preferably 0 to 2, further preferably 0 or 1 and particularly preferably 0.

Specific examples of the above X include 2,5-disulfoanilino, 2-sulfoanilino, 3-sulfoanilino, 4-sulfoanilino, 2-carboxyanilino, 4-carboxyanilino, 4-ethoxy-2-sulfoanilino, 2-methyl-5-sulfoanilino, 2-methoxy-4-nitro-5-sulfoanilino, 2-chloro-5-sulfoanilino, 3-carboxy-4-hydroxyanilino, 3-carboxy-4-hydroxy-5-sulfoanilino, 2-hydroxy-5-nitro-3-sulfoanilino, 4-acetylamino-2-sulfoanilino, 4-anilino-3-sulfoanilino, 3,5-dichloro-4-sulfoanilino, 3-phosphonoanilino, 3,5-dicarboxyanilino, 2-carboxy-4-sulfoanilino, 2-carboxy-5-sulfoanilino, 5,7-disulfonaphthalen-2-ylamino, 6,8-disulfonaphthalen-2-ylamino, 3,6-disulfonaphthalen-1-ylamino, 3,6,8-trisulfonaphthalen-1-ylamino, 8-hydroxy-3,6-disulfonaphthalen-1-ylamino, 4,8-disulfonaphthalen-2-ylamino, 3,6,8-trisulfonaphthalen-2-ylamino, 4,6,8-trisulfonaphthalen-2-ylamino, 8-chloro-3,6-disulfonaphthalen-1-ylamino, 8-hydroxy-6-sulfonaphthalen-2-ylamino and 5-hydroxy-7-sulfonaphthalen-2-ylamino and the like.

X preferably includes an anilino group substituted with a sulfo group or a carboxy group, a naphthylamino group substituted with a sulfo group or a carboxy group, or a phosphono group-substituted anilino group, and in addition, said anilino or naphthylamino group may further have 0 to 3 of at least one group selected from the group consisting of a sulfo group, a carboxy group, a phosphono group, a hydroxy group, an alkoxy group, an ureide group, an acetylamino group, a nitro group and a chlorine atom.

X can more preferably include a sulfo-substituted anilino group, a carboxy-substituted anilino group (more preferably dicarboxy-substituted anilino) or a sulfo-substituted naphthylamino group, which have 1 to 3 and preferably 1 to 2 of sulfo or carboxy groups, and it is further preferably a sulfo-substituted anilino group.

Next, Y will be explained.

Y represents an amino group; a hydroxy group; or a mono- or dialkylamino group or a nitrogen-containing heterocyclic group which may have, as a substituent on a carbon atom in the alkyl group or the heterocyclic ring, at least one group selected from the group (hereinafter, also referred to as Y substituent group) consisting of a sulfo group, a carboxy group, a phosphono group, a sulfamoyl group, a carbamoyl group, a hydroxy group, an alkoxy group (which may be further substituted with a hydroxy group), an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group. When Y is a mono- or dialkylamino group or a nitrogen-containing heterocyclic group, the number of the substituents which Y may have is usually 1 to 4, preferably 1 to 3, more preferably 1 or 2 and further preferably 1. In addition, likewise, the number of the kinds of the substituents is usually 1 to 4, preferably 1 to 3, more preferably 1 or 2 and further preferably 1.

For the mono- or dialkylamino group of the above Y, the alkyl moiety thereof may be any of straight-chain or branched-chain and preferably straight-chain. The number of carbon atoms in said alkyl moiety is usually C1-C6, preferably C1-C4 and more preferably C1-C3. Specific examples thereof can include the groups exemplified as the alkyl group in the section explaining the mono- or dialkylamino group included as a substituent on the benzene ring or the naphthalene ring in X described above. The examples of the preferable group can include a straight-chain or branched-chain C1-C6 alkyl group such as methyl, ethyl, n-propyl, n-butyl, n-pentyl, n-hexyl, isopropyl, isobutyl, sec-butyl, t-butyl, isopentyl, 2-methylbutyl and iso hexyl, and among them, it is more preferably a C1-C4 alkyl group and further preferably a C1-C3 alkyl group.

The nitrogen-containing heterocyclic group in Y includes a 5 to 7-membered ring group which contains one nitrogen atom and may further contain one oxygen atom or one nitrogen atom and preferably a 5 or 6-membered ring group bonded to a triazine ring at the nitrogen atom. Specific examples thereof include morpholin-1-yl(morpholino), piperazin-1-yl(piperazino), piperidin-1-yl(piperidino) and pyrrolidin-1-yl(pyrrolidino).

Next, the group which may be substituted as a substituent on the mono- or dialkylamino group or the nitrogen-containing heterocyclic group in Y (Y substituent group) will be explained below.

In Y substituent group, preferable ones include a sulfo group, a carboxy group, an ureide group, an alkyl group, an alkoxy group, a hydroxy group, a cyano group, a nitro group, a halogen atom and a heterocyclic group and further preferable ones include a sulfo group, a carboxy group and/or a hydroxy group.

For the alkoxy group in the above Y substituent group, the alkyl moiety thereof may be any of straight-chain, branched-chain or cyclic group, more preferably straight-chain or branched-chain, and more preferably straight-chain. The number of carbon atoms in said alkyl moiety is usually C1-C8, preferably C1-C6 and more preferably C1-C4. In addition, the above alkoxy may be further substituted with hydroxy. Specific examples of said alkoxy group include a straight-chain one such as methoxy, ethoxy, n-propoxy, n-butoxy, n-pentoxy, n-hexyloxy, n-heptyloxy and n-octyloxy; a branched-chain one such as isopropoxy, isobutoxy, t-butoxy, isopentoxy(isoamyloxy), isohexyloxy, isoheptyloxy and isooctyloxy; a cyclic one such as cyclopropoxy, cyclobutoxy, cyclopentoxy and cyclohexyloxy; an alkoxy group having a hydroxy group on the above straight-chain, branched-chain or cyclic group; and the like.

For the mono- or dialkylamino group in the above Y substituent group, the alkyl moiety thereof may be straight-chain or branched-chain. The number of carbon atoms in the alkyl moiety usually C1-C8, preferably C1-C6, and more preferably C1-C4. In the case of the dialkylamino group, the two alkyls may be the same or different, for example, one alkyl group may be straight-chain and the other may be branched-chain. Specific examples of said mono- or dialkylamino group include a straight-chain mono alkylamino group such as methylamino, ethylamino, n-propylamino, n-butylamino, n-pentylamino, n-hexylamino, n-heptylamino and n-octylamino; a branched-chain mono alkylamino group such as isopropylamino, isobutylamino, isopentylamino, isohexylamino, isoheptylamino and isooctylamino; a straight-chain dialkylamino group such as dimethylamino, diethylamino, di(n-propyl)amino, di(n-butyl)amino, di(n-pentyl)amino and di(n-hexyl)amino; a branched-chain dialkylamino group such as diisopropylamino, diisobutylamino, diisopentylamino and diisohexylamino; a dialkylamino group having each one of the different alkyl groups among straight-chain and branched-chain alkyl groups, such as methyl(ethyl)amino, methyl(n-propyl)amino and methyl(isopropyl)amino; and the like.

The mono- or diarylamino group in the above Y substituent group is preferably mono- or di C6-C10 aryl amino group and more preferably a mono- or diphenylamino group.

To the alkyl group, the halogen atom, the alkylsulfonyl group, the alkylthio group, the aryloxy group and the heterocyclic group in the above Y substituent group, the explanation of the above groups included as a substituent on the benzene ring or the naphthalene ring in X described above can be applied without change.

Next, Y will be explained.

Y can preferably include a mono- or dialkylamino group which may have at least one group selected from Y substituent group, more preferably a mono- or dialkylamino group having a preferable substituent in the above Y substituent group, and further preferably a mono- or dialkylamino group substituted with at least one group selected from the group consisting of a sulfo group, a carboxy group and a hydroxy group. Each will be more specifically explained below.

When Y is a mono alkylamino group which may have a substituent, the preferable substituent includes a sulfo group, a carboxy group, a hydroxy group and alkoxy group (preferably C1-C4 alkoxy group, which may be further substituted with a hydroxy group), and a sulfo group is more preferable. It is more preferably a monoalkylamino group substituted with such a substituent, further preferably a mono C1-C4 alkylamino group substituted with such a substituent and most preferably a sulfo-substituted mono C1-C4 alkylamino group.

Specific examples of said mono alkylamino group include 2-sulfoethylamino, 2-carboxyethylamino, carboxymethylamino, 2-hydroxyethylamino, 4-hydroxybutylamino, 5-carboxy-pentylamino, (2-hydroxyethoxy)ethylamino, 2-methoxyethylamino, 2-ethoxyethylamino, and the like.

When Y is a dialkylamino group which may have a substituent, the preferable substituent include a sulfo group, a carboxy group, an ureide group, an alkyl group, an alkoxy group, a hydroxy group, a cyano group, a nitro group, a halogen atom and a heterocyclic group, and carboxy group and hydroxy group are more preferable. Said dialkylamino group may have 2 to 4 and preferably 2 of at least one group selected from these preferable substituents. The alkyl moiety in said dialkylamino group and/or the substituent in said alkyl moiety may be the same or different but preferably the same.

Specific examples of said dialkylamino group include di(2-hydroxyethyl)amino, di(2-carboxyethyl)amino and the like.

Next, when Y is a nitrogen-containing heterocyclic group which may be substituted with a substituent selected from the above Y substituent group, the preferable substituent in the above Y substituent group includes a sulfo group, a carboxy group, an ureide group, an alkyl group, an alkoxy group, a hydroxy group, a cyano group, a nitro group, a halogen atom and a heterocyclic group, and a sulfo group, a carboxy group, a C1-C4 alkyl group and a hydroxy group are further preferable. A nitrogen-containing heterocyclic group may have 0 to 4 substituents, preferably 0 to 3 substituents and more preferably 0 or 1 substituent of 1 kind or 2 or more kinds among them.

Specific preferable examples of the substituent in said nitrogen-containing heterocyclic group include a methyl group, an ethyl group, a sulfo group, a carboxy group and a hydroxy group, and more preferable are a methyl group, an ethyl group and a carboxy group.

Specific preferable examples of said nitrogen-containing heterocyclic group include morpholin-1-yl(morpholino), 4-methyl-piperidin-1-yl(4-methylpiperidino), piperidin-1-yl (piperidino), pyrrolidin-1-yl(pyrrolidino), 3-methylpyrrolidin-1-yl, 2-carboxy-pyrrolidin-1-yl, 4-ethyl-piperazin-1-yl and the like.

Y can preferably include sulfo C1-C4 alkylamino; hydroxy C1-C4 alkylamino; hydroxy C1-C4 alkoxy C1-C4 alkylamino; di(hydroxy C1-C4 alkyl)amino; di(carboxy C1-C4 alkyl)amino; a nitrogen-containing heterocyclic group (preferably a 5 to 6-membered ring nitrogen-containing heterocyclic group).

In some cases, Y preferably includes an amino group; a hydroxy group; or a mono- or dialkylamino group or a nitrogen-containing heterocyclic group which may be substituted with a group selected from the group consisting of a hydroxy group, a sulfo group, a carboxy group and a phosphono group (more preferably the group consisting of a hydroxy group, a sulfo group and a carboxy group). More preferable are an amino group; a hydroxy group; or a mono- or di(C1-C4) alkylamino group or a 5 to 7-membered ring (further preferably a 5 or 6-membered ring) nitrogen-containing heterocyclic group which may be substituted with a group selected from a hydroxy group, a sulfo group and a carboxy group.

In this case, further, Y preferably includes an amino group; a hydroxy group; a mono(C1-C4)alkylamino group which may be substituted with a group selected from the group consisting of sulfo, carboxy, hydroxy and alkoxy (preferably C1-C4 alkoxy, which may be further substituted with hydroxy); a di(C1-C4)alkylamino group which may be substituted with carboxy or hydroxy; and a 5 to 6-membered ring nitrogen-containing heterocyclic group which may be substituted with methyl, ethyl or carboxy.

Y is most preferably sulfo C1-C4 alkylamino.

b in the formula (1) or the formula (1') described above represents the substitution number of the unsubstituted sulfamoyl group and c in the formula (1) or the formula (1') described above represents the substitution number of the substituted sulfamoyl group, respectively.

b, c and the sum of b and c in the formula (1) or the formula (1') described above are all an average value per 1 molecule of the porphyrazine coloring matter represented by the formula (1) or the formula (1') described above.

b is 0.00 or more and less than 3.90, preferably 0.00 to 3.70 and more preferably 0.00 to 3.65. In addition, in further preferable cases of b, the range thereof can include 1 or more and less than 3.9, more preferably 1.8 or more and less than 3.8 and most preferably 2.0 or more and less than 3.6.

c is 0.10 or more and less than 4.00, preferably 0.10 to 3.80 and more preferably 0.10 to 3.75. In addition, in further preferable cases of c, the range thereof can include 0.1 to 2, more preferably the range of 0.2 to 1.2 and most preferably the range of 0.4 to 1.0.

The sum of b and c is, as an average value, in the range of more than 3.00 and less than 4.00, preferably 3.01 to 3.99, more preferably 3.1 to 3.9, further preferably 3.1 to 3.8 and most preferably 3.15 to 3.75.

With regard to the compound represented by the above formula (1) of the present invention, as b is larger, the ozone fastness is apt to be improved but bronzing is apt to easily occur. The numbers of b and c may be appropriately controlled in view of ozone fastness and bronzing properties to select a balanced ratio thereof.

For example, it is particularly preferred that b and c fulfill the following relations:

$1.8 < b < 3.8$, preferably $2.0 < b < 3.6$, $0.2 \leq c \leq 1.2$, preferably $0.4 \leq c \leq 1.0$, and $3 < b+c < 4$.

Any of the unsubstituted sulfamoyl group (group where the substitution number is represented by b) and the substituted sulfamoyl group (group where the substitution number is represented by c) in the formula (1) or the formula (1') is a group placed on the benzene ring in the rings A to D but not on the nitrogen-containing heteroaromatic ring in the rings A to D.

In this regard, in the present description, any of b, c and the sum of b and c is, according to necessity, shown to the second decimal place by rounding the number in the third decimal place.

In the case where the 6-membered ring nitrogen-containing heteroaromatic ring in the rings A to D is a pyridine ring, the ring-fusion positions of said pyridine ring are preferably the 2- and 3-positions, the 3- and 4-positions, the 4- and 5-positions or the 5- and 6-positions and more preferably the 2- and 3-positions or the 5- and 6-positions when the nitrogen atom in the pyridine ring is at the 1-position.

Likewise, in the case where said nitrogen-containing heteroaromatic ring is a pyrazine ring, the ring-fusion positions of said pyrazine ring are preferably the 2- and 3-positions when the nitrogen atoms of the pyrazine ring are at the 1- and 4-positions.

The 6-membered ring nitrogen-containing heteroaromatic rings in said rings A to D may be any ones independently selected in the above and more preferably ones of a single kind than of plurality kinds.

With regard to the rings A to D, E, X, Y, the substituents which they may have, b, c, the sum of b and c, and the like in the above formula (1), a combination of preferable ones is more preferable and a combination of more preferable ones is further preferable. The same holds for further preferable ones.

The preferable copper porphyrazine coloring matter in the present invention can specifically includes as follows:

(i)

A porphyrazine coloring matter of the above formula (1) or a salt thereof, wherein:

the rings A to D each independently represent a benzene ring or a nitrogen-containing heteroaromatic ring fused to the porphyrazine ring; and the number of the nitrogen-containing heteroaromatic rings in the rings A to D is more than 0.00 and less than 1.00 as an average value, and the rest are benzene rings, E is C2-C6 alkylene, X is an anilino group or a naphthylamino group substituted with a sulfo group, a carboxy group or a phosphono group, which further has 0 to 3 substituents selected from the group consisting of a sulfo group, a carboxy group, a phosphono group, a hydroxy group, an alkoxy group, an ureide group, an acetylamino group, a nitro group and a halogen atom (more preferably a chlorine atom), Y is an amino group; a hydroxy group; or a mono- or dialkylamino group or a nitrogen-containing heterocyclic group which may have at least one group selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group, b is 0.00 or more and less than 3.90 as an average value, c is 0.10 or more and less than 4.00 as an average value, and the sum of b and c is more than 3.00 and less than 4.00 as an average value, (ii)
The porphyrazine coloring matter or a salt thereof according to the above (i), wherein the 6-membered ring nitrogen-containing heteroaromatic ring represented by the rings A to D is a pyridine ring or a pyrazine ring, and preferably a pyridine ring where the ring-fusion positions of said pyridine ring are the 2- and 3-positions or the 5- and 6-positions when the nitrogen atom is at the 1-position or a pyrazine ring where the ring-fusion positions of said pyrazine ring are the 2- and 3-positions when the nitrogen atoms are at the 1- and 4-positions, (iii)
The porphyrazine coloring matter or a salt thereof according to the above (i) or (ii), wherein the number of the 6-membered ring nitrogen-containing heteroaromatic rings in the rings A to D is 0.20 to less than 1 as an average value; and the rest of the rings A to D are benzene rings, (iv)
The porphyrazine coloring matter or a salt thereof according to the above (i) to (iii), wherein E is C2-C4 alkylene, preferably ethylene or propylene and more preferably ethylene, (v)
The porphyrazine coloring matter or a salt thereof according to any one of the above (i) to (iv), wherein X is an anilino group or a naphthylamino group substituted with a sulfo group or a carboxy group or a phosphoric acid-substituted anilino group, which further has 0 to 3 of at least one group selected from the group consisting of a sulfo group, a carboxy group, a phosphono group, a hydroxy group, an alkoxy group, an ureide group, an acetylamino group, a nitro group and a chlorine atom, (vi)
The porphyrazine coloring matter or a salt thereof according to any one of the above (i) to (iv), wherein X is a sulfo-substituted anilino group, (vii)
The porphyrazine coloring matter or a salt thereof according to any one of the above (i) to (vi), wherein Y is a mono- or di C1-C4 alkylamino group substituted with a group selected from the group consisting of a hydroxy group, a sulfo group and a carboxy group, (viii)
The porphyrazine coloring matter or a salt thereof according to any one of the above (i) to (vi), wherein Y is a mono (C1-C4)alkylamino group substituted with a sulfo group, (ix)
The porphyrazine coloring matter or a salt thereof according to any one of the above (i) to (viii), wherein:

b is 1.8<b<3.8, and c is 0.2≦c≦1.2, (x)
The porphyrazine coloring matter or a salt thereof according to any one of the above (i) to (ix), wherein:

b is 2.0<b<3.6, and c is 0.4≦c≦1.0, and the like.

In addition, in the present invention, the porphyrazine coloring matter or a salt thereof represented by the following general formula (1') is also preferable. Specifically it includes:

(xi)
A porphyrazine coloring matter or a salt thereof represented by the following formula (1'):

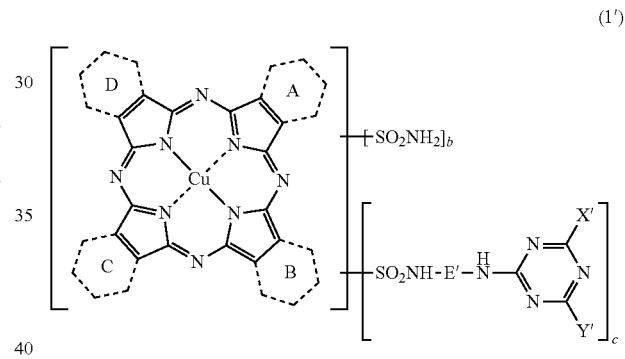

(wherein:

the rings A to D each independently represent a benzene ring or a 6-membered ring nitrogen-containing heteroaromatic ring fused to the porphyrazine ring, and the number of the nitrogen-containing heteroaromatic rings in the rings A to D is more than 0 and less than 1 as an average value, and the rest are benzene rings, E' represents C2-C4 alkylene, X' is a sulfo-substituted anilino group; a carboxy-substituted anilino group; or a sulfo-substituted naphthylamino group, Y' is an amino group; a hydroxy group; a mono- or dialkylamino group which may have, as a substituent, a hydroxy group, a sulfo group or a carboxy group on the alkyl group; or a 5 to 6-membered ring nitrogen-containing heterocyclic group which may be substituted with a C1 to C3 alkyl group or carboxy group, b is 0 or more and less than 3.9 as an average value, c is 0.1 or more and less than 4 as an average value, and the sum of b and c is 3 or more and less than 4 as an average value), (xii)
The porphyrazine coloring matter or a salt thereof according to the above (xi), wherein the 6-membered ring nitrogen-containing heteroaromatic ring is a pyridine ring, X' is a sulfo-substituted anilino group and Y is a sulfo-substituted C1-C4 alkylamino group, (xiii)

The porphyrazine coloring matter or a salt thereof according to the above (xii), wherein the number of the pyridine rings is 0.1 to less than 1 as an average value, and b and c fulfill the following relations:

$1.8 < b \leq 3.7$, preferably $2.0 < b < 3.5$, $0.2 \leq c \leq 1.2$ preferably $0.4 \leq c \leq 1.0$, and $3 < b+c \leq 3.9$, as an average value,
and the like.

The coloring matter represented by the above formula (1) can also form a salt by using an acidic functional group, such as a sulfo group, a carboxy group, a phosphono group and the like which it has in its molecule. When the coloring matter represented by the formula (1) forms a salt, it is preferred that the salt is formed with an inorganic metal cation, ammonium, organic quaternary ammonium base or the like.

The above inorganic metal includes an alkali metal and an alkali earth metal. Examples of the alkali metal include lithium, sodium, potassium and the like. The alkali earth metal includes, for example, calcium, magnesium and the like.

The above organic base particularly includes organic amine, for example, C1-C3 alkylamines such as methylamine and ethylamine; and mono-, di- or tri(C1-C4 alkanol)amines such as monoethanolamine, diethanolamine, triethanolamine, monoisopropanolamine, diisopropanolamine and tri-isopropanolamine.

The preferable salt among them includes a salt of an alkali metal such as sodium, potassium and lithium, a quaternary ammonium salt of mono-, di- or tri(C1-C4 alkanol)amine such as monoethanolamine, diethanolamine, triethanolamine, monoisopropanolamine, diisopropanolamine and tri-isopropanolamine; and an ammonium salt. It is more preferably an alkali metal salt and an ammonium salt.

Specific examples of E, X and Y and the numbers of b and c in the copper porphyrazine coloring matter represented by the above formula (1) of the present invention are shown in Table 1.

The following examples show typical compounds to specifically explain the coloring matter of the present invention. Therefore, the porphyrazine coloring matter of the present invention is not limited to the following examples. In this regard, the number of b in the table is shown to the first decimal place by rounding the number in the second decimal place in order to avoid complication of description, and in addition, the number "1" of c means "1.0", likewise by rounding the number in the second decimal place.

TABLE 1

| No. | Ring A to D | E | X | Y | b | c |
|---|---|---|---|---|---|---|
| 1 | 2,3-Pyrido: 0.1, Benzo: 3.9 | Ethylene | 4-Sulfoanilino | 2-Hydroxyethylamino | 2.9 | 1 |
| 2 | 2,3-Pyrido: 0.1, Benzo: 3.9 | Ethylene | 6-Sulfo-1-naphthylamino | 2-Sulfoethylamino | 2.9 | 1 |
| 3 | 2,3-Pyrido: 0.1, Benzo: 3.9 | Ethylene | 3,8-Disulfo-1-naphthylamino | Amino | 2.9 | 1 |
| 4 | 2,3-Pyrido: 0.1, Benzo: 3.9 | Ethylene | 3,6-Disulfo-1-naphthylamino | 2-(2-Hydroxyethoxy)ethylamino | 2.9 | 1 |
| 5 | 2,3-Pyrido: 0.1, Benzo: 3.9 | Ethylene | 4-Sulfoanilino | 2-(2-Hydroxyethoxy)ethylamino | 2.9 | 1 |
| 6 | 2,3-Pyrido: 0.1, Benzo: 3.9 | Ethylene | 3,8-Disulfo-1-naphthylamino | Morpholino | 2.9 | 1 |
| 7 | 2,3-Pyrido: 0.1, Benzo: 3.9 | Ethylene | 6,8-Disulfo-2-naphthylamino | Morpholino | 2.9 | 1 |
| 8 | 2,3-Pyrido: 0.1, Benzo: 3.9 | Ethylene | 6-Sulfo-1-naphthylamino | 2-Sulfoethylamino | 2.9 | 1 |
| 9 | 2,3-Pyrido: 0.1, Benzo: 3.9 | Ethylene | 3,8-Disulfo-1-naphthylamino | Amino | 2.9 | 1 |
| 10 | 2,3-Pyrido: 0.1, Benzo: 3.9 | Ethylene | 3,6-Disulfo-1-naphthylamino | 2-(2-Hydroxyethoxy)ethylamino | 2.9 | 1 |
| 11 | 2,3-Pyrido: 0.1, Benzo: 3.9 | Ethylene | 4-Sulfoanilino | 2-(2-Hydroxyethoxy)ethylamino | 2.9 | 1 |
| 12 | 2,3-Pyrido: 0.1, Benzo: 3.9 | Ethylene | 3,8-Disulfo-1-naphthylamino | Morpholino | 2.9 | 1 |
| 13 | 2,3-Pyrido: 0.1, Benzo: 3.9 | Ethylene | 6,8-Disulfo-2-naphthylamino | Morpholino | 2.9 | 1 |
| 14 | 2,3-Pyrido: 0.1, Benzo: 3.9 | Ethylene | 2,5-Disulfoanilino | Morpholino | 2.9 | 1 |
| 15 | 2,3-Pyrido: 0.1, Benzo: 3.9 | Ethylene | 2,4-Disulfoanilino | Morpholino | 2.9 | 1 |

TABLE 2

| No. | Ring A to D | E | X | Y | b | c |
|---|---|---|---|---|---|---|
| 16 | 2,3-Pyrido: 0.5, Benzo: 3.5 | Ethylene | 3-Sulfoanilino | 2-Sulfoethylamino | 2.5 | 1 |
| 17 | 2,3-Pyrido: 0.5, Benzo: 3.5 | Ethylene | 4-Sulfoanilino | 2-Sulfoethylamino | 2.5 | 1 |
| 18 | 2,3-Pyrido: 0.5, Benzo: 3.5 | Ethylene | 4-Sulfoanilino | Bis(2-carboxyethyl)amino | 2.5 | 1 |
| 19 | 2,3-Pyrido: 0.5, Benzo: 3.5 | Ethylene | 3,5-Dicarboxyanilino | 2-Sulfoethylamino | 2.5 | 1 |
| 20 | 2,3-Pyrido: 0.5, Benzo: 3.5 | Ethylene | 2,5-Disulfoanilino | 4-Ethylpiperazino | 2.5 | 1 |
| 21 | 2,3-Pyrido: 0.5, Benzo: 3.5 | Ethylene | 2,5-Disulfoanilino | 2-Ethylpiperidino | 2.5 | 1 |
| 22 | 2,3-Pyrido: 0.5, Benzo: 3.5 | Ethylene | 2,5-Disulfoanilino | 3-Methylpyrrolidino | 2.5 | 1 |
| 23 | 2,3-Pyrido: 0.5, Benzo: 3.5 | Ethylene | 2,5-Disulfoanilino | 2-Carboxypyrrolidino | 2.5 | 1 |
| 24 | 2,3-Pyrido: 0.5, Benzo: 3.5 | Ethylene | 2,5-Disulfoanilino | Pyrrolidino | 2.5 | 1 |

TABLE 2-continued

| No. | Ring A to D | E | X | Y | b | c |
|---|---|---|---|---|---|---|
| 25 | 2,3-Pyrido: 0.5, Benzo: 3.5 | Ethylene | 3,8-Disulfo-1-naphthylamino | Amino | 2.5 | 1 |
| 26 | 2,3-Pyrido: 0.5, Benzo: 3.5 | Ethylene | 3,6-Disulfo-1-naphthylamino | 2-(2-Hydroxyethoxy)ethylamino | 2.5 | 1 |
| 27 | 2,3-Pyrido: 0.5, Benzo: 3.5 | Ethylene | 4-Sulfoanilino | 2-(2-Hydroxyethoxy)ethylamino | 2.5 | 1 |
| 28 | 2,3-Pyrido: 0.5, Benzo: 3.5 | Ethylene | 3,8-Disulfo-1-naphthylamino | Morpholino | 2.5 | 1 |
| 29 | 2,3-Pyrido: 0.5, Benzo: 3.5 | Ethylene | 6,8-Disulfo-2-naphthylamino | Morpholino | 2.5 | 1 |
| 30 | 2,3-Pyrido: 0.5, Benzo: 3.5 | Ethylene | 2,5-Disulfoanilino | Morpholino | 2.5 | 1 |
| 31 | 2,3-Pyrido: 0.5, Benzo: 3.5 | Ethylene | 2,5-Disulfoanilino | Morpholino | 2.5 | 1 |

TABLE 3

| No. | Ring A to D | E | X | Y | b | c |
|---|---|---|---|---|---|---|
| 32 | 2,3-Pyrido: 0.9, Benzo: 3.1 | Propylene | 4-Sulfoanilino | 2-Hydroxyethylamino | 2.1 | 1 |
| 33 | 2,3-Pyrido: 0.9, Benzo: 3.1 | Ethylene | 3,5-Dicarboxyanilino | 2-Sulfoethylamino | 2.1 | 1 |
| 34 | 2,3-Pyrido: 0.9, Benzo: 3.1 | Ethylene | 3-Sulfoanilino | 2-Sulfoethylamino | 2.1 | 1 |
| 35 | 2,3-Pyrido: 0.9, Benzo: 3.1 | Ethylene | 4-Sulfoanilino | 2-Sulfoethylamino | 2.1 | 1 |
| 36 | 2,3-Pyrido: 0.9, Benzo: 3.1 | Ethylene | 4-Sulfoanilino | Bis(2-carboxyethyl)amino | 2.1 | 1 |
| 37 | 2,3-Pyrido: 0.9, Benzo: 3.1 | Butylene | 6-Sulfo-1-naphthylamino | 2-Sulfoethylamino | 2.1 | 1 |
| 38 | 2,3-Pyrido: 0.9, Benzo: 3.1 | Ethylene | 3,8-Disulfo-1-naphthylamino | Amino | 2.1 | 1 |
| 39 | 2,3-Pyrido: 0.9, Benzo: 3.1 | Ethylene | 3,6-Disulfo-1-naphthylamino | 2-(2-Hydroxyethoxy)ethylamino | 2.1 | 1 |
| 40 | 2,3-Pyrido: 0.9, Benzo: 3.1 | Ethylene | 4-Sulfoanilino | 2-(2-Hydroxyethoxy)ethylamino | 2.1 | 1 |
| 41 | 2,3-Pyrido: 0.9, Benzo: 3.1 | Ethylene | 3,8-Disulfo-1-naphthylamino | Morpholino | 2.1 | 1 |
| 42 | 2,3-Pyrido: 0.9, Benzo: 3.1 | Ethylene | 6,8-Disulfo-2-naphthylamino | Morpholino | 2.1 | 1 |
| 43 | 2,3-Pyrido: 0.9, Benzo: 3.1 | Ethylene | 2,5-Disulfoanilino | Morpholino | 2.1 | 1 |
| 44 | 2,3-Pyrido: 0.9, Benzo: 3.1 | Ethylene | 2,4-Disulfoanilino | Morpholino | 2.1 | 1 |
| 45 | 2,3-Pyrido: 0.9, Benzo: 3.1 | Ethylene | 3,5-Dicarboxyanilino | 2-Sulfoethylamino | 2.1 | 1 |
| 46 | 2,3-Pyrido: 0.9, Benzo: 3.1 | Ethylene | 4-Sulfoanilino | 2-Hydroxyethylamino | 2.1 | 1 |
| 47 | 2,3-Pyrido: 0.9, Benzo: 3.1 | Ethylene | 6-Sulfo-1-naphthylamino | 2-Sulfoethylamino | 2.1 | 1 |

TABLE 4

| No. | Ring A to D | E | X | Y | b | c |
|---|---|---|---|---|---|---|
| 48 | 2,3-Pyrido: 0.5, Benzo: 3.5 | Ethylene | 3,6,8-Trisulfo-1-naphthylamino | Morpholine | 2.5 | 1 |
| 49 | 2,3-Pyrido: 0.5, Benzo: 3.5 | Ethylene | 3,6,8-Trisulfo-1-naphthylamino | 2-Sulfoethylamino | 2.5 | 1 |
| 50 | 2,3-Pyrido: 0.5, Benzo: 3.5 | Ethylene | 3,6,8-Trisulfo-1-naphthylamino | 2-Hydroxyethylamino | 2.5 | 1 |
| 51 | 2,3-Pyrido: 0.5, Benzo: 3.5 | Ethylene | 3,6,8-Trisulfo-1-naphthylamino | 2-(2-Hydroxyethoxy)ethylamino | 2.5 | 1 |
| 52 | 2,3-Pyrido: 0.5, Benzo: 3.5 | Butylene | 2,5-Disulfoanilino | 4-Ethylpiperazino | 2.5 | 1 |
| 53 | 2,3-Pyrido: 0.5, Benzo: 3.5 | Butylene | 2,5-Disulfoanilino | 2-Ethylpiperidino | 2.5 | 1 |
| 54 | 2,3-Pyrido: 0.5, Benzo: 3.5 | Butylene | 2,5-Disulfoanilino | 3-Methylpyrrolidino | 2.5 | 1 |
| 55 | 2,3-Pyrido: 0.5, Benzo: 3.5 | Butylene | 2,5-Disulfoanilino | 2-Carboxypyrrolidino | 2.5 | 1 |
| 56 | 2,3-Pyrido: 0.5, Benzo: 3.5 | Butylene | 2,5-Disulfoanilino | Pyrrolidino | 2.5 | 1 |
| 57 | 2,3-Pyrido: 0.5, Benzo: 3.5 | Propylene | 2,5-Disulfoanilino | 4-Ethylpiperazino | 2.5 | 1 |
| 58 | 2,3-Pyrido: 0.5, Benzo: 3.5 | Propylene | 2,5-Disulfoanilino | 2-Ethylpiperidino | 2.5 | 1 |
| 59 | 2,3-Pyrido: 0.5, Benzo: 3.5 | Propylene | 2,5-Disulfoanilino | 3-Methylpyrrolidino | 2.5 | 1 |
| 60 | 2,3-Pyrido: 0.1, Benzo: 3.9 | Propylene | 2,5-Disulfoanilino | 2-Carboxypyrrolidino | 2.9 | 1 |
| 61 | 2,3-Pyrido: 0.1, Benzo: 3.9 | Propylene | 2,5-Disulfoanilino | Pyrrolidino | 2.9 | 1 |
| 62 | 2,3-Pyrido: 0.1, Benzo: 3.9 | Ethylene | 2,5-Disulfoanilino | 4-Ethylpiperazino | 2.9 | 1 |
| 63 | 2,3-Pyrido: 0.1, Benzo: 3.9 | Ethylene | 2,5-Disulfoanilino | 2-Ethylpiperidino | 2.9 | 1 |
| 63 | 2,3-Pyrido: 0.1, Benzo: 3.9 | Ethylene | 2,5-Disulfoanilino | 3-Methylpyrrolidino | 2.9 | 1 |

The method for producing the coloring matter represented by the above formula (1) will be explained.

In this regard, hereinafter, any of the compounds having the 6-membered ring nitrogen-containing heteroaromatic ring as the rings A to D is a mixture as well as the coloring matter represented by the above formula (1), unless otherwise specifically noted.

First, a copper porphyrazine compound represented by the following formula (6) is synthesized. The copper porphyrazine compound represented by the following formula (6) is obtained by reaction of a 6-membered nitrogen-containing heteroaromatic ring dicarboxylic acid derivative with a phthalic acid derivative and, according to necessity, urea in the presence of, for example, a catalyst and a copper compound. By changing the molar ratio of the nitrogen-containing heteroaromatic ring dicarboxylic acid derivative and the phthalic acid derivative in the reaction, the number of the nitrogen-containing heteroaromatic rings and the number of the benzene rings of the rings A to D can be controlled.

Formula (6)

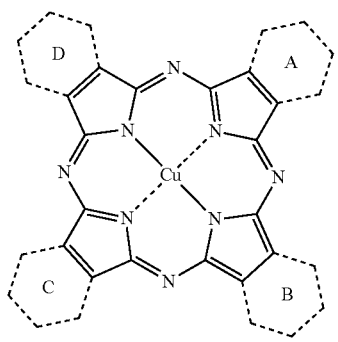

(6)

[Wherein, the rings A to D have the same meanings as described above.]

For example, the compound, where more than 0 and less than 1 of the rings A to D in the formula (6) used in the present invention is a nitrogen-containing heteroaromatic ring and the rest are benzene rings, can be obtained by using a nitrogen-containing heteroaromatic ring dicarboxylic acid derivative and a phthalic acid derivative in a ratio ranging more than 0 and less than 0.25 mol and more than 0.75 and less than 1 mol respectively and totaling 1 mol, according to the content ratio.

For example, for a compound where the nitrogen-containing heteroaromatic ring is 0.5 and the benzene ring is 3.5, the nitrogen-containing heteroaromatic ring dicarboxylic acid derivative may be used in a ratio of 0.125 mol and the phthalic acid derivative may be used in an ratio of 0.875 mol.

The nitrogen-containing heteroaromatic ring dicarboxylic acid derivative includes a 6-membered ring nitrogen-containing heteroaromatic ring dicarboxylic acid derivative having carboxy groups or reactive groups derived therefrom (such as an acid amide group, an imide group, an acid anhydride group and a carbonitrile group), respectively in two adjacent positions.

The nitrogen-containing heteroaromatic ring dicarboxylic acid derivative specifically includes a dicarboxylic acid compound such as quinolinic acid, 3,4-pyridinedicarboxylic acid and 2,3-pyrazinedicarboxylic acid; an acid anhydride such as quinolinic anhydride, 3,4-pyridinedicarboxylic anhydride and 2,3-pyrazinedicarboxylic acid anhydride; an amide compound such as pyridine-2,3-dicarboxyamide; a dicarboxylic acid monoamide compound such as pyrazine-2,3-dicarboxylic acid monoamide; an acid imide compound such as quinolinic acid imide; a dicarbonitrile compound such as pyridine-2,3-dicarbonitrile and pyrazine-2,3-dicarbonitrile. In addition, the phthalic acid derivative includes phthalic acid, phthalic anhydride, phthalamide, phthalamic acid, phthalimide, phthalonitrile, 1,3-diiminoisoindoline, 2-cyanobenzamide and the like.

Synthesis method of the copper porphyrazine compound generally includes two methods called nitrile method and Wyler method, and their reaction conditions and the like are different from each other.

Nitrile method is a method where a dicarbonitrile compound such as pyridine-2,3-dicarbonitrile, pyrazine-2,3-dicarbonitrile and phthalonitrile is used as a raw material to synthesize porphyrazine.

On the other hand, Wyler method uses, as a raw material, a dicarboxylic acid compound such as phthalic acid, quinolinic acid, 3,4-pyridinedicarboxylic acid and 2,3-pyrazinedicarboxylic acid; an acid anhydride compound such as phthalic anhydride, quinolinic anhydride, 3,4-pyridinedicarboxylic anhydride and 2,3-pyrazinedicarboxylic acid anhydride; a dicarboxyamide compound such as phthalamide and pyridine-2,3-dicarboxyamide; a dicarboxylic acid monoamide compound such as phthalamic acid and pyrazine-2,3-dicarboxylic acid monoamide; and an acid imide compound such as phthalimide and quinolinic acid imide. In addition, in Wyler method, addition of urea is essential and the use amount of urea is 5 to 100 times in molar quantity relative to the total 1 mol of the nitrogen-containing heteroaromatic ring dicarboxylic acid compound or a derivative thereof and the phthalic acid compound or a derivative thereof.

The reaction is carried out in the presence of a solvent, and as a solvent in nitrile method, an organic solvent having a boiling point of 100° C. or more and more preferably 130° C. or more is used. Said organic solvent includes, for example, n-amyl alcohol, n-hexanol, cyclohexanol, 2-methyl-1-pentanol, 1-heptanol, 1-octanol, 2-ethylhexanol, N,N-dimethylaminoethanol, benzyl alcohol, ethylene glycol, propylene glycol, trichlorobenzene, chloronaphthalene, nitrobenzene, quinoline, sulfolane, urea and the like.

In addition, as a solvent in Wyler method, an aprotic organic solvent having a boiling point of 150° C. or more and more preferably 180° C. or more is used. For example, it includes trichlorobenzene, chloronaphthalene, nitrobenzene, quinoline, sulfolane, urea and the like.

The use amount of the solvent is 1 to 100 times in mass of the total of the nitrogen-containing heteroaromatic ring dicarboxylic acid derivative and the phthalic acid derivative.

As the catalyst, the following ones can be used.

In nitrile method, the catalyst includes amines such as quinoline, 1,8-diazabicyclo[5.4.0]-7-undecene, tributylamine, ammonia and N,N-dimethylaminoethanol or alkali metal alcoholates such as sodium ethoxide and sodium methoxide.

On the other hand, in Wyler method, it includes ammonium molybdate and boric acid.

The addition amount of the catalyst is 0.001 to 1 mol relative to the total 1 mol of the nitrogen-containing heteroaromatic ring dicarboxylic acid derivative and the phthalic acid derivative.

The copper compound includes metal copper, a halide, carboxylate, sulfate, nitrate, acetylacetonate and complex of copper, and the like. For example, copper chloride, copper bromide, copper acetate, copper acetylacetonate and the like are included.

The use amount of the copper compound is 0.15 to 0.35 mol relative to the total 1 mol of the nitrogen-containing heteroaromatic ring dicarboxylic acid derivative and the phthalic acid derivative.

In nitrile method, the reaction temperature is usually 100 to 200° C. and preferably 130 to 170° C.

On the other hand, in Wyler method, the reaction temperature is 150 to 300° C. and preferably 170 to 220° C.

The reaction time varies depending on the reaction conditions and is usually 1 to 40 hours. After completion of reaction, the intended product is separated by filtration, washed and dried to obtain a copper porphyrazine compound represented by the above formula (6). The introduction ratio of the 6-membered ring nitrogen-containing heteroaromatic ring in the rings A to D of the obtained compound represented by the above formula (6) can be determined by elemental analysis.

The synthesis method will be more specifically explained by taking, as an example, a compound represented by the above formula (6) wherein 0.50 of the rings A to D is a pyridine ring and the rest 3.50 thereof are benzene rings.

By reacting quinolinic acid (0.125 mol), phthalic anhydride (0.875 mol), copper (II) chloride (0.25 mol), ammonium molybdate (0.004 mol) and urea (6 mol) in a sulfolane solvent at 200° C. for 5 hours, a copper porphyrazine compound represented by the above formula (6) wherein 0.50 of the rings A, B, C and D is a pyridine ring and the rest 3.50 thereof are benzene rings is obtained. The reactivity varies depending on the kinds and the use amounts of the quinolinic acid, the phthalic anhydride, the metal compound, the solvent, the catalyst and the like, so the synthesis method is not limited to the above.

By chlorosulfonylation of the obtained copper porphyrazine compound represented by the above formula (6) in chlorosulfonic acid; by sulfonation of the copper porphyrazine compound represented by the above formula (6) in sulfuric acid or fuming sulfuric acid and then by conversion of said sulfo group to a chlorosulfonyl group with a chlorination agent; or the like, a copper porphyrazine compound represented by the above formula (3) is obtained. The chlorosulfonyl group or the sulfo group obtained by the above chlorosulfonylation or sulfonation is introduced on the benzene ring in the rings A to D of the above formula (6) but not on said heteroaromatic ring. One chlorosulfonyl or sulfo group is usually introduced on the benzene ring, so the number of the introduced chlorosulfonyl or sulfo group is within the number of the benzene rings. Therefore, the number (n) of the chlorosulfonyl groups in the above formula (3) which is derived from said sulfo group is more than 3.00 and less than 4.00 corresponding to the number of the benzene rings in a compound represented by the above formula (3).

The copper porphyrazine compound represented by the above formula (3) can be also obtained by another synthesis method. For example, it is also possible to obtain an intended compound represented by the above formula (3) by cyclocondensation of sulfophthalic acid or a derivative thereof having one sulfo group with nitrogen-containing heteroaromatic ring dicarboxylic acid or a derivative thereof such as quinolinic acid to synthesize a copper porphyrazine compound having a sulfo group represented by the following formula (10) and then by conversion of the sulfo group to a chlorosulfonyl group.

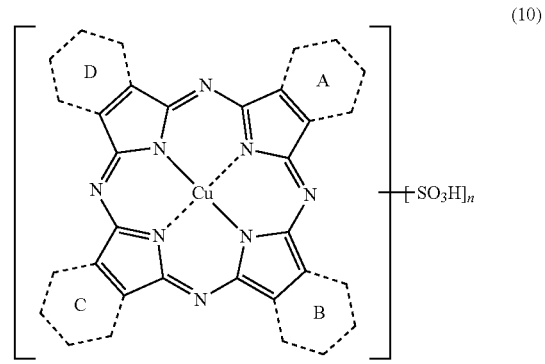

[Wherein, the rings A to D and n have the same meanings as in the above formula (3).]

The chlorosulfonylation of the copper porphyrazine compound represented by the above formula (6) uses, as a solvent, chlorosulfonic acid usually 3 to 20 times and preferably 5 to 10 times in mass relative to said copper porphyrazine compound. The reaction temperature is usually 100 to 150° C. and preferably 120 to 150° C. The reaction time varies depending on the reaction conditions such as reaction temperature, and it is usually 1 to 10 hours. In this case, the substituent of the obtained copper porphyrazine compound is usually a mixture of a chlorosulfonyl group and a sulfo group. In the present invention, it is preferred that after the reaction with a chlorosulfonic acid solvent, a chlorination agent such as thionyl chloride is added to said reaction liquid and the mixture is further reacted to convert the rest sulfo groups to chlorosulfonyl groups so that all the substituents are chlorosulfonyl groups.

The amount of said chlorination agent is about 0.5 to 10 equivalents and preferably 0.5 to 5 equivalents relative to that of the sulfo group in a sulfo-substituted copper porphyrazine compound by-produced in the first reaction in a chlorosulfonic acid solvent. Said chlorination agent includes thionyl chloride, sulfuryl chloride, phosphorus trichloride, phosphorus pentachloride, phosphorous oxychloride and the like, but not limited thereto.

Conversion of the sulfo group in the sulfo-substituted copper porphyrazine compound represented by the above formula (10) to a chlorosulfonyl group can be carried out by reaction of the above chlorination agent with said compound in the same manner as the above. The solvent for said chlorination reaction can include sulfuric acid, fuming sulfuric acid, chlorosulfonic acid, benzene, toluene, nitrobenzene, chlorobenzene, N,N-dimethylformamide, N,N-dimethylacetoamide and the like.

By reaction of the copper porphyrazine compound represented by the above formula (3) obtained as the above with organic amine represented by the formula (4) described later in the presence of ammonia or an ammonia-generating compound (which are also altogether referred to as an aminating agent) in a water solvent at about pH 8 to 10 and 5 to 70° C. for 1 to 20 hours, a copper porphyrazine coloring matter represented by the above formula (1) of the present invention. In the present description, the ammonia-generating compound means a compound generating ammonia by, for example, operation of neutralization, heating or the like, such as various ammonium salts. The aminating agent to be used in the above reaction includes, for example, an ammonium salt generating ammonia by neutralization of ammonium chloride, ammonium sulfate and the like; a compound generating ammonia by heating, such as urea; ammonia water; ammonia gas; and the like. The above aminating agent preferably includes ammonia water or an ammonium salt generating ammonia by neutralization and more preferably ammonia water. But, the above aminating agent is not limited to these. In addition, the reaction of a compound represented by the above formula (3) with an organic amine represented by the following formula (4) with the above aminating agent is usually carried out in water or in a water-containing solvent and preferably in water as described the above.

Formula (4)

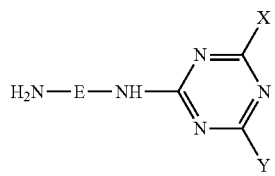

(4)

[Wherein, E, X and Y have the same meanings as described above.]

The use amount of an organic amine represented by the above formula (4) is usually 1 molar time or more of the theoretical value corresponding to c value in the above formula (1), relative to 1 mol of a compound represented by the above formula (3). However, it varies depending on the reactivity of said organic amine and the conditions for introduction reaction of said organic amine, so it is difficult to generally suggest.

The use amount of said organic amine usually is about 1 to 3 molar times and preferably 1 to 2 molar times relative to the theoretical value corresponding to the value of the above c. As c value is larger, it is necessary that the amount of an organic amine represented by the above formula (4) to be used in said introduction reaction is larger relative to the theoretical value corresponding to said c value.

A product obtained by reaction of a compound represented by the above formula (3), an aminating agent and organic amine represented by the above formula (4) is not a single compound but a mixture of compounds with different values of b and c. However, it is a compound containing b and c in the above described range as an average value, and said compound can achieve the purposes of the present invention. Therefore, there is no problem although the details of said mixture are unclear.

The production method of the organic amine represented by the above formula (4) will be explained. The organic amine represented by the above formula (4) can be produced by a known method.

For example, 0.95 to 1.1 mol of an aniline or a naphthylamine corresponding X are reacted with 1 mol of 2,4,6-trichloro-S-triazine (cyanuric chloride) in water under the conditions of about pH 2.5 to 7 and 5 to 40° C. for 2 to 12 hours to obtain a first condensate.

Then, when Y is an amino group, 1 mol of the obtained first condensate is reacted with 0.95 to 2.0 mol of ammonia under the conditions of about pH 4 to 10 and 5 to 80° C. for 0.5 to 12 hours to obtain a second condensate.

In addition, when Y is a hydroxy group, an alkali metal hydroxide such as sodium hydroxide is added to the reaction liquid of the first condensate and the mixture is reacted under the conditions of about pH 4 to 10 and 5 to 80° C. for 0.5 to 12 hours to obtain a second condensate.

Further, when Y is a substituted or unsubstituted mono- or dialkylamino group or a nitrogen-containing heterocyclic group, 1 mol of the obtained first condensate is reacted with 0.95 to 1.1 mol of an amine corresponding to each group under the conditions of pH 4 to 10 and 5 to 80° C. for 0.5 to 12 hours to obtain a second condensate.

Then, 1 mol of the obtained second condensate is reacted with 1 to 50 mol of an alkylenediamine corresponding to E under the conditions of about pH 9 to 12 and 5 to 90° C. for 0.5 to 12 hours to obtain a compound represented by the above formula (4). The pH adjustment of each reaction liquid in the condensation reaction can be usually carried out using an alkali metal hydroxide such as sodium hydroxide and potassium hydroxide or an alkali metal carbonate such as sodium carbonate and potassium carbonate. In this regard, the order of condensation is appropriately determined according to the reactivity of the kind of each compound and not limited to the above.

Next, by-products and the like produced in synthesis of a copper porphyrazine coloring matter represented by the above formula (1) will be explained.

The copper porphyrazine coloring matter represented by the above formula (1) is synthesized from a compound represented by the above formula (3), an aminating agent and an organic amine represented by the above formula (4), and the synthesis is usually carried out using a water solvent. Due to this, it is theoretically considered that some of the chlorosulfonyl groups in the formula (3) are hydrolyzed by water during reaction to by-produce a compound where they are converted to sulfonic acid groups, and said by-products come to be mixed in an intended coloring matter represented by the formula (1).

However, it is difficult to distinguish between unsubstituted sulfamoyl groups and sulfonic acid groups by mass spectrometry. Therefore, in the present invention, all the chlorosulfonyl groups in the formula (3) other than ones reacted with an organic amine represented by the formula (4) are described as ones converted to unsubstituted sulfamoyl groups.

In addition, a copper porphyrazine ring (Pz) form a dimer (for example, Pz-L-Pz) or a trimer via a divalent linking group (L) during reaction to by-produce impurity, and said by-product occasionally come to be mixed in a reaction product.

The above divalent linking group represented by L includes —$SO_2$—, —$SO_2$—NH—$SO_2$— or the like, and in some cases of trimer, a by-product where two Ls of these are combined is formed.

The thus-obtained copper porphyrazine coloring matter represented by the above formula (1) can be separated by filtration or the like after aciding out or salting out. It is preferred that salting out is carried out in the range of, for example, acidic to alkaline pH and preferably pH 1 to 11. The temperature in salting out is not particularly limited but usually 40 to 80° C. and preferably 50 to 70° C. Specifically, it is preferred that a reaction liquid containing a porphyrazine coloring matter of the present invention is heated to the above temperature and then sodium chloride or the like is added thereto to adjust the pH to the above range for salting out.

The copper porphyrazine coloring matter represented by the above formula (1) of the present invention which is synthesized by the above method is obtained in a form of free acid or a salt thereof. To obtain its free acid, for example, aciding out may be carried out. On the other hand, to obtain its salt, salting out may be carried out. If an intended salt cannot be obtained by salting out, a usual salt exchange method may be utilized, for example, a method where an intended organic or inorganic base or the like is added to its free acid; or otherwise.

Next, the ink composition of the present invention will be explained.

The copper porphyrazine coloring matter represented by the above formula (1) of the present invention exhibits a vivid cyan color. Therefore, the ink composition containing this can be suitably used mainly as a cyan ink. Said ink composition may be used not only as a cyan ink having a high concentration but also as a cyan ink having a low coloring matter concentration (referred to as light cyan ink or photo cyan ink) which is used to smoothly reproduce gradation part of an image or to reduce granular appearance of a hypochromic region. In addition, it may be mixed with a yellow coloring matter to be used as a green ink, and it may be mixed with a magenta coloring matter to be used as a violet or blue ink. Further, it can be mixed with a plural of colors to prepare inks, so it can be used as a dark yellow color, a gray color or a black color.

The ink composition of the present invention is prepared using water as a medium.

When this ink composition is used as an inkjet ink, it is preferred that the copper porphyrazine coloring matter of the present invention contained as a coloring matter is one where the content of an anion such as $Cl^-$, $SO_4^{2-}$ and the like is less. Only as a guide for the content, the total content of $Cl^-$ and $SO_4^{2-}$ in the total mass of the copper porphyrazine coloring matter is 5% by mass or less, preferably 3% by mass or less and further preferably 1% by mass or less. Relative to the total mass of the ink composition of the present invention, the total content of said anions is 1% by mass or less, preferably 0.5% by mass or less and more preferably 0.1% by mass or less. The lower limit of the total content of said anions may be, in any case, the detection limit or less of a detection apparatus, specifically 0% by mass. As said detection apparatus, for example, ion chromatography can be used.

In order to produce a porphyrazine coloring matter of the present invention with a smaller content of said anions, desalting treatment may be carried out by a usual method using, for example, a reverse osmosis membrane, by stirring a dried form or a wet cake of a porphyrazine coloring matter of the present invention in aqueous alcohol, or otherwise. The alcohol used at this time is a C1-C4 alcohol, preferably a C1-C3 alcohol, and specifically methanol, ethanol, n-propanol or 2-propanol(isopropanol). As desalination method using aqueous alcohol, a method where it is heated nearly to the boiling point of alcohol and then cooled for desalination can be used.

The porphyrazine coloring matter of the present invention subjected to desalting treatment in aqueous alcohol is obtained by filtration-separation in a conventional manner, and according to necessity, by drying in a conventional manner.

When the ink composition of the present invention is used as an inkjet ink, the porphyrazine coloring matter of the present invention contained in said ink composition is preferably one where the content of impurities such as heavy metal (ion) such as zinc and iron, ion such as calcium, silica and the like, other than the above anions is less.

Only as a guide for the content of the above impurities, for example, each of a heavy metal (ion) such as zinc and iron, an ion such as calcium, silica and the like is about 500 ppm or less in a dried and purified product of the porphyrazine coloring matter of the present invention. The lower limit of the content of said impurities may also be 0 ppm as well as the above.

The content of ions such as heavy metal can be measured by ion chromatography, atomic absorption method or ICP (Inductively Coupled Plasma) emission spectrometry.

However, the porphyrazine coloring matter represented by the above formula (1) of the present invention contains copper (ion) as a central metal, so this central metal is not included in the impurity.

The ink composition of the present invention contains 0.1 to 8% by mass and preferably 0.3 to 6% by mass of the copper porphyrazine coloring matter represented by the above formula (1). The rest is water.

The ink composition of the present invention may further contain, according to necessity, a water-soluble organic solvent within the range that does not impair the effects of the present invention. A water-soluble organic solvent is used for the purpose of functions such as dye-dissolving, dry-preventing (moistening), viscosity modifying, penetration-enhancing, surface tension-controlling and/or antifoaming. It is preferred that the ink composition of the present invention contains a water-soluble organic solvent.

As other ink preparation agents, for example, an additive such as an antiseptic and fungicide, a pH adjuster, a chelating agent, a rust preventive agent, a ultraviolet absorbing agent, a viscosity modifier, a dye dissolving agent, an antifading agent, an emulsion stabilizer, a surface tension-controlling agent, an antifoaming agent, a dispersing agent, a dispersion stabilizer and the like may be further contained.

It is preferred that the ink composition of the present invention contains 0 to 60% by mass, preferably 5 to 50% by mass and more preferably 10 to 50% by mass of a water-soluble organic solvent and 0 to 20% by mass and preferably 0 to 15% by mass of an ink preparation agent, respectively relative to the total amount of the ink composition. The rest is water.

The water-soluble organic solvent described above includes, for example, C1 to C4 alkanol such as methanol, ethanol, n-propanol, isopropanol, n-butanol, isobutanol, secondary butanol or tertiary butanol; carboxylic acid amide such as N,N-dimethylformamide or N,N-dimethylacetoamide; heterocyclic ketone such as 2-pyrrolidone, N-methyl-2-pyrrolidone, 1,3-dimethylimidazolidin-2-one or 1,3-dimethylhexahydropyrimid-2-one; ketone or keto alcohol such as acetone, methyl ethyl ketone or 2-methyl-2-hydroxypentan-4-one; cyclic ether such as tetrahydrofuran or dioxane; mono, oligo or polyalkylene glycol or thioglycol having a C2-C6 alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol or polypropylene glycol; polyol (preferably C3-C6 triol) such as glycerine or hexane-1,2,6-triol; C1-C4 monoalkyl ether of polyhydric alcohol such as ethylene glycol monomethyl ether, ethylene glycol monoethyl ether, diethylene glycol monomethyl ether, diethylene glycol monoethyl ether, diethylene glycol monobutyl ether(butyl carbitol), triethylene glycol monomethyl ether or triethylene glycol monoethyl ether; gamma-butyrolactone, dimethylsulfoxide or the like.

As the above water-soluble organic solvent, preferable are isopropanol, glycerine, mono-, di- or triethylene glycol, dipropylene glycol, 2-pyrrolidone and N-methyl-2-pyrrolidone and more preferably isopropanol, glycerine, diethylene glycol, 2-pyrrolidone and butyl carbitol.

These water-soluble organic solvents are used alone or as a mixture thereof.

The antiseptic and fungicide includes, for example, organic sulfur-based, organic nitrogen sulfur-based, organic halogen-based, haloallylsulfone-based, iodopropargyl-based, N-haloalkylthio-based, benzothiazole-based, nitrile-based, pyridine-based, 8-oxyquinoline-based, isothiazoline-based, dithiol-based, pyridineoxide-based, nitropropane-based, organic tin-based, phenol-based, quaternary ammonium salt-based, triazine-based, thiadiazine-based, annilide-based, adamantane-based, dithiocarbamate-based, brominated indanone-based, benzyl bromoacetate-based and inorganic salt-based compounds.

The organic halogen-based compound includes, for example, sodium pentachlorophenol. The pyridineoxide-based compound includes, for example, sodium 2-pyridinethiol-1-oxide. The isothiazoline-based compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like.

Specific examples of other antiseptic and fungicides include sodium sorbate, sodium benzoate, sodium acetate and the like, and commercial products thereof include, for example, Proxel® GXL(S), Proxel® XL-2(S) and the like which are trade names and manufactured by Avecia Corp.

In this regard, the superscript "®" in the present description represents Registered Trademark.

As the pH adjuster, any substance can be used as long as it can control the pH of the ink in the range of 6.0 to 11.0 for the purpose of improving ink storage stability. It includes, for example, alkanolamine such as diethanolamine and triethanolamine; alkali metal hydroxide such as lithium hydroxide, sodium hydroxide and potassium hydroxide; ammonium hydroxide; alkali metal carbonate such as lithium carbonate, sodium carbonate and potassium carbonate; or the like The chelating agent includes, for example, disodium ethylenediaminetetraacetate, sodium nitrilotriacetate, sodium hydroxyethylethylenediaminetriacetate, sodium diethylenetriaminepentaacetate, sodium uracil diacetate and the like. The rust preventive agent includes, for example, hydrogen sulfite salt, sodium thiosulfate, ammonium thioglycolate, diisopropyl ammonium nitrite, pentaerythritol tetranitrate, dicyclohexylammonium nitrite and the like.

The ultraviolet absorbing agent includes, for example, a benzophenone-based compound, a benzotriazole-based compound, a cinnamic acid-based compound, a triazine-based compound, a stilbene-based compound and the like. In addition, a compound absorbing ultraviolet rays and emitting fluorescence as typified by a benzoxazole-based compound, so-called a fluorescent brightening agent, can be also used.

The viscosity modifier includes, other than a water-soluble organic solvent, a water-soluble polymer compound, for example, polyvinyl alcohol, cellulose derivatives, polyamine, polyimines and the like.

The dye dissolving agent includes, for example, urea, epsilon-caprolactam, ethylene carbonate and the like.

The antifading agent is used for the purpose of improving image storage stability. As the antifading agent, various organic-based and metal complex-based antifading agents can be used. The organic-based antifading agent includes hydroquinones, alkoxyphenols, dialkoxyphenols, phenols, anilines, amines, indanes, chromans, alkoxyanilines, heterocyclic compounds and the like, and the metal complex-based antifading agent includes a nickel complex, a zinc complex and the like.

The surface tension-controlling agent includes a surfactant, for example, an anionic surfactant, an amphoteric surfactant, a cationic surfactant, a nonionic surfactant and the like.

The anionic surfactant includes alkylsulfocarboxylate, alpha-olefin sulfonate, polyoxyethylene alkyl ether acetate, N-acylamino acid and a salt thereof, N-acylmethyltaurine salt, alkylsulfate polyoxyalkyl ether sulfate, alkylsulfate polyoxyethylene alkyl ether phosphate, rosin acid soap, castor oil sulfate, lauryl alcohol sulfate, alkylphenol-type phosphate ester, alkyl-type phosphate ester, alkylaryl sulfonate, diethyl sulfosuccinate, diethyl hexyl sulfosuccinate, dioctyl sulfosuccinate and the like.

The cationic surfactant includes a 2-vinylpyridine derivative, a poly(4-vinylpyridine) derivative and the like.

The amphoteric surfactant includes lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine and in addition, an imidazoline derivative.

The nonionic surfactant includes compounds of ether-type such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester-type such as polyoxyethylene oleate ester, polyoxyethylene distearate ester, sorbitan laurate, sorbitan monostearate, sorbitan monooleate, sorbitan sesquioleate, polyoxyethylene monooleate and polyoxyethylene stearate; acetylene alcohol type such as 2,4,7,9-tetramethyl-5-decyne-4,7-diol, 3,6-dimethyl-4-octyne-3,6-diol and 3,5-dimethyl-1-hexyn-3-ol; and the like. Other specific examples thereof include, for example, Surfynol® 104, 82 and 465, Olfine® STG (all manufactured by Nissin Chemical Industry Co., Ltd.) and the like.

As the antifoaming agent, highly oxidized oil-based, glycerin fatty acid ester-based, fluorine-based and silicone-based compounds are used according to necessity.

These ink preparation agents are used alone or as a mixture thereof. In this regard, the surface tension of the ink of the present invention is usually 25 to 70 mN/m and more preferably 25 to 60 mN/m. In addition, the viscosity of the ink of the present invention is preferably controlled at 30 mPa·s or less and more preferably 20 mPa·s or less.

In preparation of the ink composition of the present invention, the order of dissolving the agents is not particularly limited. Water used in preparation of the ink composition is preferably one with less impurity, such as ion-exchanged water or distilled water. In addition, microfiltration may be carried out, according to necessity, using a membrane filter to remove foreign substances, and it is preferred to carry out microfiltration when the ink composition of the present invention is used as an inkjet ink. The pore size of filter for microfiltration is usually 1 μm to 0.1 μm and preferably 0.8 μm to 0.1 μm.

The ink composition of the present invention can be used not only for monochrome image formation but also for full color image formation. For full color image formation, it can be also used as an ink set of 3 primary colors in combination of the cyan ink of the present invention together with magenta ink and yellow ink, and as an ink set of 4 colors in combination also with black ink. Further, in order to form a higher resolution image, it can be also used as an ink set in combination with light magenta ink, blue ink, green ink, orange ink, dark yellow ink, gray ink and the like. As a coloring matter of each color contained for these inks, any known coloring matter can be used.

The ink composition of the present invention can be used in a recording method such as impress printing, copying, marking, writing, drafting, stamping and the like, and it is particularly suitable for use in an inkjet recording method.

The colored product of the present invention is one colored with the porphyrazine coloring matter of the present invention or a water-based ink composition containing this. The material to be colored therewith includes, for example, communication sheet such as paper and film, fiber and cloth (such as cellulose, nylon and wool), glass, metal, ceramics, leather, a substrate for a color filter and the like, and among them, communication sheet is preferable.

The communication sheet is preferably one subjected to surface treatment, specifically one provided with an ink receiving layer on a substrate such as paper, synthetic paper or film. Said ink receiving layer is provided by, for example, a method where a substrate described above is impregnated in a cation polymer or coated with a cation polymer; a method where the surface of a substrate described above is coated with inorganic particles which can absorb coloring matter in ink, such as porous silica, aluminasol or special ceramics together with a hydrophilic polymer such as polyvinyl alcohol and polyvinylpyrrolidone; or the like.

The communication sheet provided with such an ink receiving layer is usually called inkjet professional paper (film), glossy paper (film) or the like. Among them, one considered susceptible to gas having oxidizing effect in the air such as ozone gas is inkjet professional paper of a type where a substrate surface is coated with inorganic particles which can absorb coloring matter in ink, such as porous silica, aluminasol or special ceramics.

Typical examples of the above professional paper available as a commercial product include Professional Photopaper and Super Photopaper, which are trade names and manufactured by Canon Inc.; Photo Paper CRISPIA (highly glossy), Photo Paper (glossy) and Photo Matte Paper, which are trade names and manufactured by Seiko-Epson Corporation; Advanced Photo Paper (glossy), Premium Glossy Film and Photo Paper, which are trade names and manufactured by Hewlett Packard Japan, Ltd.; High Quality Paper and Glossy Photo Paper, which are trade names and manufactured by Sony Corporation; and the like. In addition, plain paper can be naturally used.

As a method of coloring in order to obtain the colored product of the above present invention, any method may be used. One of the preferable methods of coloring is a method where the above materials are colored with the ink composition of the present invention using an inkjet printer. The record-receiving material is not particularly limited to the materials described above, and it can be any other substance as long as it can be colored by an inkjet printer.

In order to record a material described above or an article by the inkjet recording method of the present invention, for example, an container containing the ink composition of the present invention is placed in a predetermined position of an inkjet printer to use said ink composition as an ink and recording is carried out on the material or the article by a usual method.

The inkjet printer includes, for example, a piezo type printer utilizing mechanical vibration; a bubble jet® type printer utilizing bubbles generated by heating; and the like.

In addition, in image formation, a polymer particle dispersion (also referred to as polymeric latex) may be used for the purpose of imparting glossiness and water fastness and improving weatherability.

The time to apply polymeric latex to a record-receiving material may be before, after or at the same time as applying the coloring matter.

Therefore, in the recording method of the present invention, recording may be carried out on a record-receiving material containing polymeric latex with the ink composition of the present invention, or recording may be carried out using the ink composition of the present invention containing polymeric latex. In addition, polymeric latex may be applied as a single liquid to a record-receiving material before or after recording on the record-receiving material with said ink composition.

The ink composition of the present invention is free from precipitation or separation during storage. In addition, when the ink according to the present invention is used for inkjet recording, it does not cause clogging in an injector (inkhead). The ink according to the present invention is also free from changes in physical properties, in recording for a relatively long time and constant recirculation by a continuous ink jet printer or in intermittent recording by an on-demand printer.

The ink composition of the present invention exhibits a vivid cyan color, and by using this as an ink, recorded matter excellent particularly in ozone fastness and also in light fastness and water fastness can be obtained.

By using cyan inks respectively having a high or low concentration and additionally in combination with other inks excellent in ozone fastness, light fastness and water fastness, such as yellow and magenta and, according to necessity, together with other inks such as green, red, orange and blue, recorded matter which can express color tone in a further wide visible region and is excellent particularly in ozone fastness and also excellent in light fastness and water fastness can be obtained.

EXAMPLES

Hereinafter, the present invention will be more specifically explained with reference to the examples, but the present invention is not limited to said examples. In this regard, "part(s)" and "%" described herein are based on mass unless otherwise specifically noted.

In addition, the expression "(20% to the liquid)" or the like represents "% by mass" of an added compound relative to the total liquid volume (based on mass) at the point.

Further, in mixtures and coloring matters obtained in the examples, when the 6-membered ring nitrogen-containing heteroaromatic ring in the rings A to D is a pyridine ring, the ring-fusion-positions of said pyridine ring fused to the porphyrazine ring are the 2- and 3-positions or the 5- and 6-positions. Furthermore, the numbers of the benzene rings and the 6-membered ring nitrogen-containing heteroaromatic rings in the rings A to D and the values of b and c are shown to the second decimal place by rounding the number in the third decimal place. The b and c values can be determined by measurement of copper content by ICP emission spectrometry with an intended compound as a sample, by measurement of water content by Karl Fischer method and by measurement of the content of inorganic impurity (ion such as a sodium, potassium and chlorine atom) by ion chromatography.

In this regard, any of the synthesized porphyrazine coloring matters of the present invention showed a solubility of 100 g/L or more in water.

Example 1

(1) Synthesis of a compound wherein 0.25 of the rings A to D of the formula (6) is a pyridine ring and the rest 3.75 thereof are benzene rings.

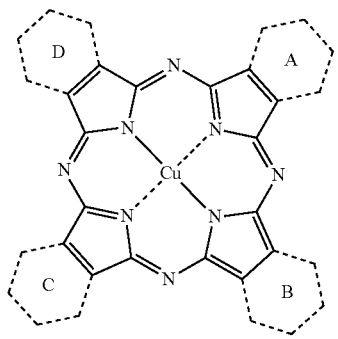

(6)

To a four-neck flask, 375 parts of sulfolane, 41.6 parts of phthalic anhydride, 3.13 parts of quinolinic acid, 108 parts of urea, 10.1 parts of copper (II) chloride and 1.5 parts of ammonium molybdate were added, and the liquid temperature was raised to 200° C. and the same temperature was maintained for 5 hours. After completion of the reaction, the liquid temperature was cooled to 65° C., 50 parts of DMF were added thereto, and the precipitated solid was separated by filtration. The resulting solid was washed with 50 parts of DMF to obtain 75.2 parts of a wet cake. The whole volume of the obtained wet cake was added to 450 parts of DMF, the liquid temperature was raised to 110° C. and the same temperature was maintained for 1 hour. The solid was separated by filtration and washed with 200 parts of water to obtain a wet cake. The obtained wet cake was added to 450 parts of 5% hydrochloric acid, the liquid temperature was raised to 60° C. and the same temperature was maintained for 1 hour. The solid was separated by filtration and washed with 200 parts of water to obtain a wet cake. The whole volume of the obtained wet cake was added to 450 parts of 5% ammonia water and said liquid temperature was maintained at 60° C. for 1 hour. The solid was separated by filtration and washed with 200 parts of water to obtain 82.6 parts of a wet cake. The obtained wet cake was dried at 80° C. to obtain 26.3 parts of an intended compound of the above formula (6) as a blue solid.

Elemental analysis: $C_{127}H_{63}N_{33}Cu_4$

|  | C | H | N | Cu |
|---|---|---|---|---|
| Theoretical value: | 66.17 | 2.76 | 11.03 | 20.05 |
| Actual value: | 65.79 | 2.95 | 10.94 | 19.81 |

(2) Synthesis of a compound wherein 0.25 of the rings A to D of the formula (3) is a pyridine ring, the rest 3.75 thereof are benzene rings and n is 3.75.

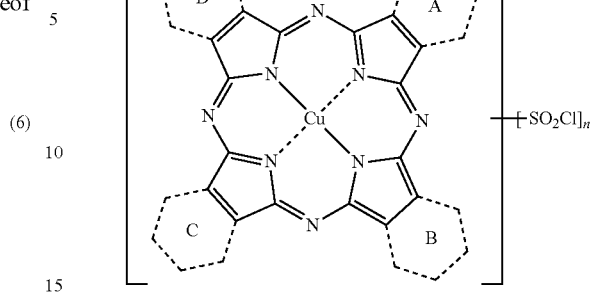

(3)

To 46.2 parts of chlorosulfonic acid, 5.8 parts of the compound obtained in Example 1 (1) were gradually added at 60° C. or less while stirring, and the reaction was carried out at 140° C. for 4 hours. Next, the reaction liquid was cooled to 70° C., 17.9 parts of thionyl chloride were added dropwise thereto over 30 minutes, and the reaction was carried out at 70° C. for 3 hours. The reaction liquid was cooled to 30° C. or less and slowly poured into 800 parts of ice water, and the precipitated solid was separated by filtration and washed with 200 parts of cold water to obtain 42.0 parts of a wet cake of an intended compound.

(3) Synthesis of a compound represented by the following formula (15) [compound of the formula (4) wherein X is 4-sulfoanilino, Y is 2-sulfoethylamino and E is ethylene].

Formula (15)

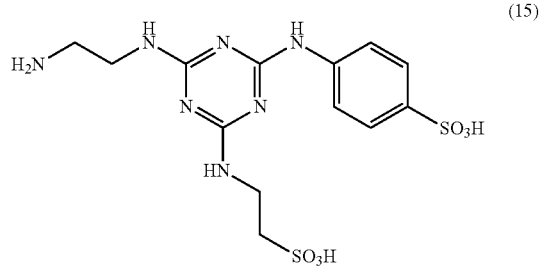

(15)

To 330 parts of ice water, 18.4 parts of cyanuric chloride and 0.2 parts of LEOCOL TD-90 which is a trade name (of a surfactant manufactured by Lion Corporation) were added, and the mixture was stirred at 10° C. or less for 30 minutes. Next, 17.4 parts of 4-sulfoaniline (purity 99.3%) were added thereto and the reaction was carried out at pH 2.6 to 3.0 and 0 to 5° C. for 1 hour, at pH 3.0 to 3.5 and 0 to 5° C. for 1 hour and further at the same pH and 25 to 30° C. for 1 hour. The pH of this reaction was adjusted using a 10% aqueous sodium hydroxide solution. To the resulting reaction liquid, 12.6 parts of 2-sulfoethylamine were added, and the reaction was carried out at 25° C. for 2 hours while adjusting to pH 7.0 to 8.0 using a 10% aqueous sodium hydroxide solution. To the resulting reaction liquid, 250 parts of ice were added for cooling to 0° C., and then 60 parts of ethylenediamine were added dropwise to said reaction liquid while maintaining the temperature of said reaction liquid at 5° C. or less. The resulting mixed liquid was stirred at room temperature overnight and then adjusted to pH 1.0 using concentrated hydrochloric acid. During stirring, the liquid temperature was maintained at 10 to 15° C. while adding ice. At this time, the liquid volume was 980 parts. To this reaction liquid, 190 parts of sodium chloride were added, and the mixture was stirred for 30 minutes to precipitate a solid. The precipitated solid was separated by filtration to obtain 70.6 parts of a wet cake. The obtained wet cake was put into a beaker, 280 parts of water were added, and the mixture was adjusted to pH 9.0 using a 10% aqueous sodium hydroxide solution to dissolve the obtained wet cake. At this time, the liquid volume was 400 parts. To this reaction liquid, concentrated hydrochloric acid was added to adjust to pH 1.0, 80 parts of sodium chloride were added thereto, and the mixture was stirred for 30 minutes to precipitate a solid. The precipitated solid was separated by filtration to obtain 110.1 parts of a wet cake. The obtained wet cake was put into a beaker, 260 parts of methanol and 26 parts of water were added, and the resulting suspension was stirred at 50° C. for 1 hour. After that, the solid was separated by filtration to obtain 89.1 parts of a wet cake. The obtained wet cake was dried to obtain 49.3 parts of white powder of an intended compound represented by the above formula (15).

(4) Synthesis of a coloring matter of the present invention represented by the following formula (16) [coloring matter of the above formula (1) wherein 0.25 of the rings A to D is a pyridine ring, the rest 3.75 thereof are benzene rings, E is ethylene, X is 4-sulfoanilino, Y is 2-sulfoethylamino, b is 3.10 and c is 0.65].

Formula (16)

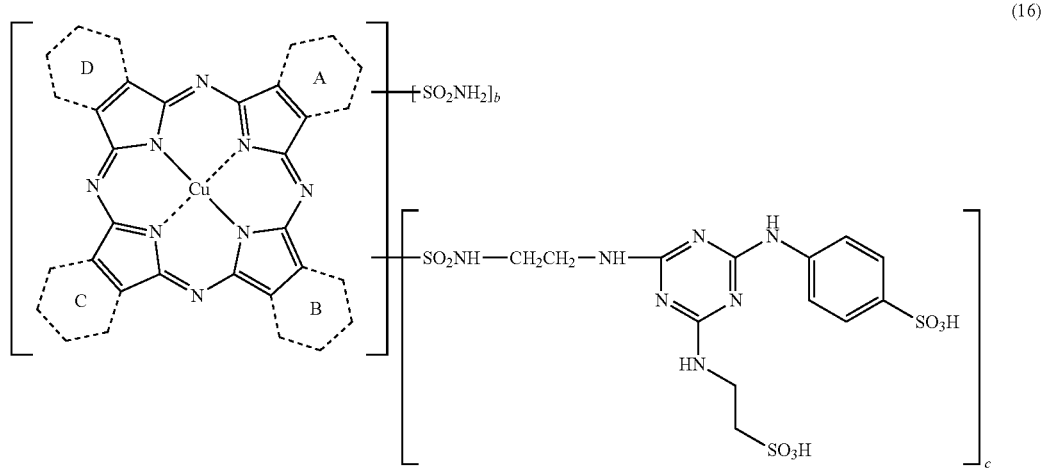

To 50 parts of ice water, 42.0 parts of a wet cake of the compound of the formula (3) obtained in the above (2) of the present example were added, and the mixture was suspended at 5° C. or less. Ten minutes later, while maintaining said liquid temperature at 10° C. or less, 2 parts of 28% ammonia water and a solution dissolving 2.6 parts of a compound represented by the above formula (15) in 30 parts of water were added thereto. In addition, while adding 28% ammonia water thereto, the pH of said liquid was maintained at 9.0, the liquid temperature was raised to 20° C. over 1 hour, and the reaction was carried out at the same temperature for 8 hours. The liquid volume at this time was 230 parts. The temperature of the reaction liquid was raised to 50° C., 46 parts of sodium chloride (20% to the liquid) was added thereto, and said liquid was stirred for 30 minutes. Then, after concentrated hydrochloric acid was added thereto over 20 minutes to adjust to pH 1.0, the precipitated solid was separated by filtration and then washed with 100 parts of a 20% aqueous sodium chloride solution to obtained 49.0 parts of a wet cake. The obtained wet cake was dissolved in 200 parts of water by adjusting the pH of the liquid to 9.0 using a 25% aqueous sodium hydroxide solution. The liquid volume at this time was 260 parts. The temperature of this solution was raised to 50° C., 52 parts of sodium chloride (20% to the liquid) were added, and the mixture was stirred for 30 minutes. Thereto, concentrated hydrochloric acid was added over 20 minutes to adjust to pH 1.0, and then the precipitated solid was separated by filtration and washed with 100 parts of a 20% aqueous sodium chloride solution to obtain 49.2 parts of a wet cake. To the obtained wet cake, 255 parts of methanol and 45 parts of water were added, the resulting suspension was stirred at 50° C. for 1 hour, and then the solid was separated by filtration to obtain 36.5 parts of a wet cake. The obtained wet cake was dried to obtain 10.1 parts of an intended coloring matter represented by the above formula (16) of the present invention as blue powder.

λmax: 607.0 nm (in aqueous solution)

Example 2

(1) Synthesis of a compound of the above formula (6) wherein 0.85 of the rings A to D is a pyridine ring and the rest 3.15 thereof are benzene rings.

To a four-neck flask, 375 parts of sulfolane, 34.96 parts of phthalic anhydride, 10.65 parts of quinolinic acid, 108 parts of urea, 10.1 parts of copper (II) chloride and 1.5 parts of ammonium molybdate were added, the liquid temperature was raised to 200° C. and the same temperature was maintained for 5 hours. After completion of the reaction, the liquid temperature was cooled to 65° C., 50 parts of DMF were added and the precipitated solid was separated by filtration. The resulting solid was washed with 50 parts of DMF to obtain 79.2 parts of a wet cake. The whole volume of the obtained wet cake was added to 450 parts of DMF, the liquid temperature was raised to 110° C. and the same temperature was maintained for 1 hour. After that, the solid was separated by filtration and washed with 200 parts of water to obtain a wet cake. Then, the obtained wet cake was added to 450 parts of 5% hydrochloric acid, the liquid temperature was raised to 60° C., and the same temperature was maintained for 1 hour.

After that, the solid was separated by filtration and washed with 200 parts of water to obtain a wet cake. The whole volume of the obtained wet cake was added to 450 parts of 5% ammonia water and said liquid was maintained at 60° C. for 1 hour. The solid was separated by filtration and washed with 200 parts of water to obtain 82.6 parts of a wet cake. The obtained wet cake was dried at 80° C. to obtain 29.3 parts of an intended compound of the above formula (6) as a blue solid.

| Elemental analysis: $C_{635}H_{315}N_{165}Cu_{20}$ | | | | |
|---|---|---|---|---|
| | C | H | N | Cu |
| Theoretical value: | 64.85 | 2.65 | 11.01 | 21.49 |
| Actual value: | 64.39 | 2.95 | 10.49 | 20.67 |

(2) Synthesis of a compound of the above formula (3) wherein 0.85 of the rings A to D is a pyridine ring, the rest 3.15 thereof are benzene rings, and n is 3.15.

To 46.2 parts of chlorosulfonic acid, 5.8 parts of the compound obtained in the above (1) of the present example were gradually added at 60° C. or less, and the reaction was carried out at 140° C. for 4 hours. Next, the reaction liquid was cooled to 70° C., 17.9 parts of thionyl chloride were added dropwise thereto over 30 minutes, and the reaction was carried out at 70° C. for 3 hours. The reaction liquid was cooled to 30° C. or less and slowly poured into 800 parts of ice water, and the precipitated solid was separated by filtration and washed with 200 parts of cold water to obtain 40.0 parts of a wet cake of an intended compound.

(3) Synthesis of a coloring matter of the present invention represented by the above formula (16) [coloring matter of the above formula (1) wherein 0.85 of the rings A to D is a pyridine ring, the rest 3.15 thereof are benzene rings, E is ethylene, X is 4-sulfoanilino, Y is 2-sulfoethylamino, b is 2.52 and c is 0.63].

To 50 parts of ice water, 40.0 parts of the wet cake of the compound obtained in the above (2) of the present example were added, and the mixture was suspended at 5° C. or less. Ten minutes later, while maintaining the liquid temperature at 10° C. or less, 2 parts of 28% ammonia water and a solution dissolving 3.0 parts of the compound represented by the formula (15) in 30 parts of water were added thereto. In addition, the pH was maintained at 9.0 while adding 28% ammonia water thereto, the liquid temperature was raised to 20° C. over 1 hour and maintained at the same temperature for 8 hours. The liquid volume at this time was 230 parts. The temperature of the resulting reaction liquid was raised to 50° C., 46 parts of sodium chloride (20% to the liquid) were added thereto, and said liquid was stirred for 30 minutes. Then, concentrated hydrochloric acid was added thereto over 20 minutes to adjust the pH to 1.0. The precipitated solid was separated by filtration and washed with 100 parts of a 20% aqueous sodium chloride solution to obtain 51.0 parts of a wet cake. The obtained wet cake was dissolved in 200 parts of water by adjusting the pH of the liquid to 9.0 using a 25% aqueous sodium hydroxide solution. The liquid volume at this time was 260 parts. The temperature of the dissolving liquid was raised to 50° C., 52 parts of sodium chloride (20% to the liquid) were added thereto, said liquid was stirred for 30 minutes and then the pH of the liquid was adjusted to 1.0 over 20 minutes with concentrated hydrochloric acid. The precipitated solid was separated by filtration and washed with 100 parts of a 20% aqueous sodium chloride solution to obtain 48.2 parts of a wet cake. To the obtained wet cake, 255 parts of methanol and 45 parts of water were added, the liquid was stirred at 50° C. for 1 hour and then the precipitated solid was separated by filtration to obtain 33.5 parts of a wet cake. The obtained wet cake was dried to obtain 10.4 parts of an intended coloring matter represented by the above formula (16) of the present invention as blue powder.

λmax: 603.0 nm (in aqueous solution)

Comparative Example 1

(1) Synthesis of a compound represented by the above formula (6) wherein 1.00 of the rings A to D is a pyridine ring and the rest 3.00 thereof are benzene rings.

To a four-neck flask, 375 parts of sulfolane, 33.29 parts of phthalic anhydride, 12.53 parts of quinolinic acid, 108 parts of urea, 10.1 parts of copper (II) chloride and 1.5 parts of ammonium molybdate were added, the liquid temperature was raised to 200° C. and the same temperature was maintained for 5 hours. After completion of the reaction, the liquid temperature was cooled to 65° C., 50 parts of DMF were added thereto, and the precipitated solid was separated by filtration. The resulting solid was washed with 50 parts of DMF to obtain 73.1 parts of a wet cake. The whole volume of the obtained wet cake was added to 450 parts of DMF, the liquid temperature was raised to 110° C., and the same temperature was maintained for 1 hour. The solid was separated by filtration and washed with 200 parts of water to obtain a wet cake. The obtained wet cake was added to 450 parts of 5% hydrochloric acid, the liquid temperature was raised to 60° C., and the same temperature was maintained for 1 hour. The solid was separated by filtration and washed with 200 parts of water to obtain a wet cake. The whole volume of the obtained wet cake was added to 450 parts of 5% ammonia water and the solution was maintained at 60° C. for 1 hour. The solid was separated by filtration and washed with 200 parts of water to obtain 78.1 parts of a wet cake. The obtained wet cake was dried at 80° C. to obtain 24.1 parts of an intended compound as a blue solid.

(2) Synthesis of a compound of the above formula (3) wherein 1.00 of the rings A to D is a pyridine ring, the rest 3.00 thereof are benzene rings, and n is 3.

To 46.2 parts of chlorosulfonic acid, 5.8 parts of the compound obtained in the above (1) of the present comparative example were gradually added at 60° C. or less while stirring, the reaction was carried out at 140° C. for 4 hours. The resulting reaction liquid was cooled to 70° C., 17.9 parts of thionyl chloride were added dropwise thereto over 30 minutes, and the reaction was carried out at 70° C. for 3 hours. The reaction liquid was cooled to 30° C. or less and slowly poured into 800 parts of ice water, and the precipitated solid was separated by filtration and washed with 200 parts of cold water to obtain 42.4 parts of a wet cake of an intended compound.

(3) Synthesis of a coloring matter for comparison represented by the above formula (16) [coloring matter of the above formula (1) wherein 1.00 of the rings A to D is a pyridine ring, the rest 3.00 thereof are benzene rings, E is ethylene, X is 4-sulfoanilino, Y is 2-sulfoethylamino, b is 2.31, and c is 0.70].

To 50 parts of ice water, 42.4 parts of the wet cake obtained in the above (2) of the present comparative example were added, and the mixture was suspended at 5° C. or less. Ten minutes later, while maintaining the liquid temperature at 10° C. or less, 2 parts of 28% ammonia water and a solution dissolving 2.6 parts of a coloring matter represented by the formula (15) in 30 parts of water were added thereto. While 28% ammonia water was further added thereto and the pH of said suspension was maintained at 9.0, the liquid temperature was raised to 20° C. over 1 hour and maintained at the same temperature for 8 hours. The liquid volume at this time was 225 parts. The temperature of the reaction liquid was raised to 50° C., 45 parts of sodium chloride (20% to the liquid) were added thereto, and said liquid was stirred for 30 minutes. Then, after the pH of the liquid was adjusted to 1.0 with concentrated hydrochloric acid over 20 minutes, the precipitated solid was separated by filtration and washed with 100 parts of a 20% aqueous sodium chloride solution to obtain 45.0 parts of a wet cake. The obtained wet cake was dissolved in 200 parts of water by adjusting the pH of the liquid to 9.0 using a 25% aqueous sodium hydroxide solution. The liquid volume at this time was 260 parts. The temperature of the resulting solution was raised to 50° C., 52 parts of sodium chloride (20% to the liquid) were added, and said liquid was stirred for 30 minutes. Then, after the pH of said liquid was adjusted to 1.0 with concentrated hydrochloric acid over 20 minutes, the precipitated solid was separated by filtration and washed with 100 parts of a 20% aqueous sodium chloride solution to obtain 44.2 parts of a wet cake. After 255 parts of methanol and 45 parts of water were added to the obtained wet cake and said liquid was stirred at 50° C. for 1 hour, the solid was separated by filtration to obtain 31.5 parts of a wet cake. The obtained wet cake was dried to obtain 8.1 parts of an intended coloring matter for comparison represented by the above formula (16) as blue powder.
λmax: 603.0 nm (in aqueous solution)

Comparative Example 2

(1) Synthesis of copper tetrabenzoporphyrazine tetrasulfonyl chloride [compound of the above formula (3) wherein all of the rings A to D are benzene rings and n is 4].

To 46.2 parts of chlorosulfonic acid, 5.8 parts of copper tetrabenzoporphyrazine were gradually added at 60° C. or less while stirring, and the reaction was carried out at 140° C. for 4 hours. Next, the reaction liquid was cooled to 70° C., 17.9 parts of thionyl chloride were added dropwise thereto over 30 minutes, and the reaction was carried out at 70° C. for 3 hours. The reaction liquid was cooled to 30° C. or less and slowly poured into 800 parts of ice water, and the precipitated solid was separated by filtration and washed with 200 parts of cold water to obtain 40.4 parts of a wet cake of an intended compound.

(2) Synthesis of a coloring matter for comparison represented by the above formula (16) [coloring matter of the above formula (1) wherein all of the rings A to D are benzene rings, E is ethylene, X is 4-sulfoanilino, Y is 2-sulfoethylamino, b is 3.35 and c is 0.65].

To 50 parts of ice water, 40.4 parts of the wet cake of the compound obtained in the above (1) of the comparative example were added, and the mixture was suspended at a liquid temperature of 5° C. or less. Ten minutes later, while maintaining the liquid temperature at 10° C. or less, 2 parts of 28% ammonia water and a solution dissolving 2.6 parts of a coloring matter represented by the formula (15) in 30 parts of water were added thereto. The pH of said liquid was maintained at 9.0 while further adding 28% ammonia water thereto, the liquid temperature was raised to 20° C. over 1 hour and maintained at the same temperature for 8 hours. The liquid volume at this time was 225 parts. The temperature of the reaction liquid was raised to 50° C., 45 parts of sodium chloride (20% to the liquid) were added to the reaction liquid, and the mixture was stirred for 30 minutes. Then, after concentrated hydrochloric acid was added to the solution over 20 minutes to adjust to pH 1.0, the precipitated solid was separated by filtration and washed with 100 parts of a 20% aqueous sodium chloride solution to obtain 43.1 parts of a wet cake. The obtained wet cake was dissolved in 200 parts of water by adjusting the pH of the liquid to 9.0 using a 25% aqueous sodium hydroxide solution. The liquid volume at this time was 260 parts. The temperature of the resulting solution was raised to 50° C., 52 parts of sodium chloride (20% to the liquid) were added, and the mixture was stirred for 30 minutes. Then, after concentrated hydrochloric acid was added to the solution over 20 minutes to adjust to pH 1.0, the precipitated solid was separated by filtration and washed with 100 parts of a 20% aqueous sodium chloride solution to obtain 45.2 parts of a wet cake. To the obtained wet cake, 255 parts of methanol and 45 parts of water were added, the mixture was stirred at 50° C. for 1 hour, and then the solid was separated by filtration to obtain 36.5 parts of a wet cake. The obtained wet cake was dried to obtain 10.1 parts of an intended coloring matter for comparison represented by the above formula (16) as blue powder.
λmax: 609.0 nm (in aqueous solution)

Example 3

(A) Preparation of Ink

The ingredients described in the following table 5 were dissolved by mixing and filtered using a 0.45 μm membrane filter (manufactured by Advantec Co. Ltd) to obtain an ink for testing. In this regard, ion-exchanged water was used as water. In addition, water and sodium hydroxide (pH adjuster) were added in order to adjust the pH of the ink to 8 to 10 and make the total amount 100 parts. The coloring matters of the present invention used for evaluation were coloring matters respectively obtained in Examples 1 and 2, the ink prepared using the coloring matter of Example 1 is C-1, and the ink prepared using the coloring matter of Example 2 is C-2.

TABLE 5

| | |
|---|---|
| Coloring matter obtained in the above Example | 5.0 parts |
| Water + sodium hydroxide | 59.2 parts |
| Glycerine | 9.4 parts |
| Urea | 9.4 parts |
| N-methyl-2-pyrrolidone | 7.5 parts |
| IPA(isopropyl alcohol) | 5.6 parts |
| Butyl carbitol | 3.7 parts |
| Surfynol$^{RTM}$ 104PG50 (which is a trade name; Note 1) | 0.2 parts |
| Total | 100.0 parts |

Note 1:
A surfactant manufactured by Nissin Chemical Industry Co., Ltd.

In the same manner as the above except that the coloring matters for comparison obtained in Comparative Examples 1 and 2 were used respectively instead of the coloring matters of the present invention obtained in Examples, inks for comparison were prepared. The ink prepared using the coloring matter of Comparative Example 1 is C-3 and the ink prepared using the coloring matter of Comparative Example 2 is C-4.

(B) Inkjet Recording

Using an inkjet printer (manufactured by Canon Inc.; trade name: PIXUS® ip4100), inkjet recording was performed on glossy paper A [manufactured by Hewlett Packard Japan, Ltd.; trade name: Advanced Photo Paper (glossy)] and glossy paper B [manufactured by Seiko-Epson Corporation; trade name: CRISPIA (glossy)] with each ink of C-1 to C-4 prepared in the above.

By inkjet recording, a checked pattern (pattern where 1.5 mm-squares having a density of 100% and 1.5 mm-squares having a density of 0% were alternately placed) was made and a printed matter of cyan/white having a high contrast was obtained, which was used as a test piece. In this regard, the white area is an area of the paper itself, which was not colored with the ink. When judgment by visual observation was conducted in the section "4. Water fastness evaluation" below, the printed matter of this checked pattern was used.

In addition, an image pattern was made so that six gradations of 100%, 85%, 70%, 55%, 40% and 25% in reflection density were obtained, and each recorded matters obtained was used as a test piece for each test below. In light fastness test and ozone fastness test, measurement was conducted using the gradation part of each printed matter where the reflection density, Dc value, was nearest to 1.0 of the six gradations before test. Color measurement was conducted using SpectroEye manufactured by GretagMacbeth under conditions of a D65 light source, density criteria of DIN and a viewing angle of 2 degrees.

(C) Evaluation of Recorded Image

1. Ozone Fastness Test (Residual Rate)

Using an ozone weatherometer (manufactured by Suga Test Instruments Co., Ltd.; Model: OMS-H), each test piece was left at an ozone concentration of 10 ppm, a chamber temperature of 24° C., and a humidity of 60% RH for 16 hours. The cyan reflection density (Dc value) of each test piece was measured before and after the test, and the coloring matter residual rate was determined by calculation from (reflection density after test/reflection density before test)×100 (%), and evaluated in two levels. The evaluation criteria are shown below.

◯: Coloring matter residual rate is 75% or more.

X: Coloring matter residual rate is less than 75%.

The results are shown in Tables 6 and 7.

2. Ozone Fastness Test (Color Difference)

Using an ozone weatherometer (manufactured by Suga Test Instruments Co., Ltd.; Model: OMS-H), each test piece was left at an ozone concentration of 10 ppm, a chamber temperature of 24° C., and a humidity of 60% RH for 16 hours. The Dc value of each test piece was measured before and after the test, the color difference (ΔE) was determined and evaluated on two levels.

◯: ΔE is less than 10.

X: ΔE is 10 or more.

The results are shown in Tables 6 and 7.

3. Evaluation of Bronzing

In evaluation of bronzing, visual observation was conducted for which the print density where bronzing occurred is, among the six print densities of 100%, 85%, 70%, 55%, 40% and 25%. The ink where bronzing did not occur in any of the six levels is marked as OK, the ink where bronzing occurred is marked with the lowest print density of the above six levels at which bronzing occurred.

The results are shown in Tables 6 and 7.

4. Water Fastness Evaluation

A drop of ion-exchanged water was dropped on the recorded image of each test piece and the test piece was naturally dried for a day to evaporate the water droplet, and then the state of bleeding from the printed part into the unprinted part before and after the test was judged by visual observation. The evaluation criteria are as follows:

Bleeding into the unprinted part is not observed at all. . . . ⊚

Bleeding into the unprinted part is slightly observed. . . . ◯

Bleeding state of the unprinted part is bad. . . . X

The results are shown in Tables 6 and 7.

TABLE 6

| | Glossy paper A | | | |
|---|---|---|---|---|
| | Ozone fastness | | | |
| Ink No. | Residual rate | Color difference | Bronzing | Water fastness |
| C-1 | ◯ | ◯ | OK | ⊚ |
| C-2 | ◯ | ◯ | OK | ⊚ |
| C-3 | ◯ | ◯ | OK | ⊚ |
| C-4 | X | X | OK | ⊚ |

TABLE 7

| | Glossy paper B | | | |
|---|---|---|---|---|
| | Ozone fastness | | | |
| Ink No. | Residual rate | Color difference | Bronzing | Water fastness |
| C-1 | ◯ | ◯ | OK | ⊚ |
| C-2 | ◯ | ◯ | 85 | ◯ |
| C-3 | ◯ | ◯ | 70 | X |
| C-4 | ◯ | X | OK | ⊚ |

As is clear from the tables 6 and 7, the ink C-3 of Comparative Example 1 shows excellent results for ozone fastness but the bronzing of its printed matter of glossy paper B is the worst among Examples and Comparative Examples, and in addition, it has the worst results for water fastness. On the other hand, the ink C-4 of Comparative Example 2 is excellent in anti-bronzing and water fastness but has very poor results for ozone fastness on any of the glossy papers.

By contrast, the cyan ink using the compound of the present invention has an excellent hue and shows excellent results for ozone fastness, specifically for residual rate in ozone exposure and for discoloration before and after the test. In addition, it is clear that it has an excellent durability against water and it is an excellent coloring matter which hardly causes bronzing.

The invention claimed is:

1. A porphyrazine coloring matter represented by the following formula (1) or a salt thereof:

$$\begin{array}{c}\text{(Porphyrazine structure with Cu center, rings A, B, C, D, substituted with } [SO_2NH_2]_b \text{ and } [SO_2NH\text{-}E\text{-}NH\text{-}(triazine with X, Y)]_c)\end{array} \quad (1)$$

wherein:
the rings A to D each independently represent a benzene ring or a 6-membered ring nitrogen-containing heteroaromatic ring fused to the porphyrazine ring, the number of the nitrogen-containing heteroaromatic rings in the rings A to D is more than 0.00 and less than 1.00 as an average value, and the rest are benzene rings, E represents alkylene, X is an anilino group or a naphthylamino group having, as a substituent, at least one group selected from the group consisting of a sulfo group, a carboxy group and a phosphono group, and said anilino or naphthylamino group may be further substituted with at least one group selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group, Y represents an amino group; a hydroxy group; a mono- or dialkylamino group or a nitrogen-containing heterocyclic group which may have 1 kind or 2 or more kinds of substituents selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group, for the combination of X and Y, a combination where Y is an amino group or a hydroxy group and X is a substituted anilino group is not included, b represents the substitution number of the unsubstituted sulfamoyl group and is 0.00 or more and less than 3.90 as an average value, c represents the substitution number of the substituted sulfamoyl group and is 0.10 or more and less than 4.00 as an average value, and the sum of b and c is more than 3.00 and less than 4.00 as an average value.

2. The porphyrazine coloring matter or a salt thereof according to claim 1, wherein in the formula (1) described in claim 1, the 6-membered ring nitrogen-containing heteroaromatic ring represented by the ring A to D is a pyridine ring or a pyrazine ring.

3. The porphyrazine coloring matter or a salt thereof according to claim 1, which is obtained by reaction of a porphyrazine compound represented by the following formula (3) with an organic amine represented by the following formula (4) in the presence of ammonia:

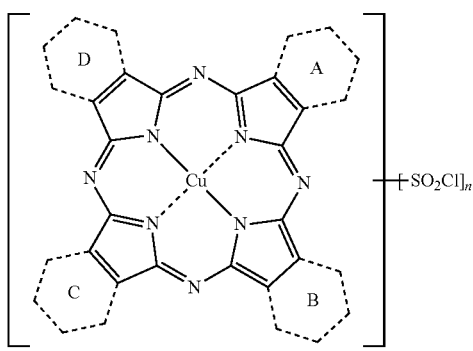

(3)

wherein, the rings A to D have the same meanings as those described in claim 1, and n is more than 3 and less than 4;

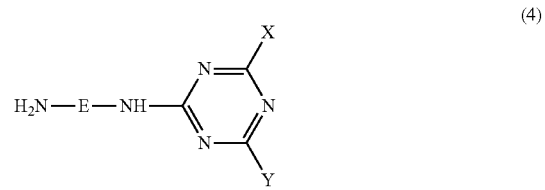

(4)

wherein, E, X and Y have the same meanings as those described in claim 1.

4. The porphyrazine coloring matter or a salt thereof according to claim 1, wherein:

the 6-membered ring nitrogen-containing heteroaromatic ring in the rings A to D is a pyridine ring and the ring-fusion positions of said pyridine ring are the 2- and 3-positions, the 3- and 4-positions, the 4- and 5-positions or the 5- and 6-positions when the nitrogen atom of the pyridine ring is at the 1-position, or the 6-membered ring nitrogen-containing heteroaromatic ring in the rings A to D is a pyrazine ring and the ring-fusion positions of said pyrazine ring are the 2- and 3-positions when the nitrogen atoms of the pyrazine ring are at the 1- and 4-positions, E is C2-C4 alkylene, X is an anilino group or an naphthylamino group having, as a substituent, a sulfo group, a carboxy group or a phosphono group, and said anilino or naphthylamino group may further have 0 to 3 substituents of 1 kind or 2 or more kinds selected from the group consisting of a sulfo group, a carboxy group, a phosphono group, a hydroxy group, an alkoxy group, an ureide group, an acetylamino group, a nitro group and a chlorine atom, Y is an amino group; a hydroxy group; or a mono- or di C1-C4 alkylamino group or a 5 to 7 membered nitrogen-containing heterocyclic group which may be substituted with a group selected from the group consisting of a hydroxy group, a sulfo group, a carboxy group and a phosphono group.

5. The porphyrazine coloring matter or a salt thereof according to claim 1, wherein:

the number of 6-membered ring nitrogen-containing heteroaromatic rings in the rings A to D is 0.20 to 0.90 as an average value and the rest are benzene rings, b is 0.00 to 3.70 as an average value, c is 0.10 to 3.80 as an average value, and the sum of b and c is 3.10 to 3.80 as an average value.

6. The porphyrazine coloring matter or a salt thereof according to claim 1, wherein:

the number of 6-membered ring nitrogen-containing heteroaromatic rings in the rings A to D is 0.25 to 0.85 as an average value, E represents C2-C4 alkylene, X is an anilino group or a naphthylamino group substituted with a sulfo group or a carboxy group; or a phosphoric acid-substituted anilino group, and said anilino and naphthylamino groups may also have 0 to 3 substituents of 1 kind or 2 or more kinds selected from the group consisting of a sulfo group, a carboxy group, a phosphono group, a hydroxy group, an alkoxy group, an ureide group, an acetylamino group, a nitro group and a chlorine atom, Y is an amino group; a hydroxy group; a mono- or dialkylamino group or a nitrogen-containing heterocyclic group which may be substituted with a group selected from the group consisting of a hydroxy group, a sulfo group, a carboxy group and a phosphono group, b is 0.00 to 3.65 as an average value, c is 0.10 to 3.75 as an average value, and the sum of b and c is 3.15 to 3.75 as an average value.

7. The porphyrazine coloring matter or a salt thereof according to claim 1, wherein:

E is ethylene or propylene,

X is a sulfo-substituted anilino group; a carboxy-substituted anilino group; or a sulfo-substituted naphthylamino group, and Y is an amino group; a hydroxy group; a mono- or dialkylamino group or a nitrogen-containing heterocyclic group which may be substituted with a hydroxy group, a sulfo group, or a carboxy group.

8. The porphyrazine coloring matter or a salt thereof according to claim 7, wherein the 6-membered ring nitrogen-containing heteroaromatic ring in the rings A to D is a pyridine ring and the ring-fusion positions of said pyridine ring are the 2- and 3-positions or the 5- and 6-positions when the nitrogen atom of the pyridine ring is at the 1-position.

9. An ink composition comprising the porphyrazine coloring matter or a salt thereof according to any one of claims 1 or 6 to 8 as a coloring matter and further containing water.

10. The ink composition according to claim 9, which further contains an organic solvent.

11. The ink composition according to claim 9, which is for inkjet recording.

12. An inkjet recording method where recording is performed by discharging an ink droplet of the ink composition containing the porphyrazine coloring matter or a salt thereof according to claim 1 and water in response to a recording signal to adhere on a record-receiving material.

13. The inkjet recording method according to claim 12, wherein the record-receiving material is a communication sheet.

14. The inkjet recording method according to claim 13, wherein the communication sheet is a sheet which is subjected to surface treatment and has an ink receiving layer containing white inorganic pigment particles on the support thereof.

15. A container filled with an ink composition containing the porphyrazine coloring matter or a salt thereof according to claim 1 and water.

16. An inkjet printer comprising the container according to claim 15.

17. A colored product colored with an ink composition containing the porphyrazine coloring matter or a salt thereof according to claim 1 and water.

18. The porphyrazine coloring matter or a salt thereof according to claim 1, wherein:

the 6-membered ring nitrogen-containing heteroaromatic ring in the rings A to D is a pyridine ring or a pyrazine ring, E is a C2-C4 alkylene group, X is a sulfo-substituted anilino group, a carboxy-substituted anilino group or a sulfo-substituted naphthylamino group, and Y is an amino group; a hydroxy group; a mono(C1-C4)alkylamino group which may be substituted with a group selected from the group consisting of a sulfo group, a carboxy group, a hydroxy group and an alkoxy group; a di(C1-C4)alkylamino group which may be substituted with a carboxy group or a hydroxy group; or a 5 to 6-membered ring nitrogen-containing heterocyclic group which may be substituted with a methyl group, an ethyl group or a carboxy group.

19. The porphyrazine coloring matter or a salt thereof according to claim 1, wherein:

the 6-membered ring nitrogen-containing heteroaromatic ring in the rings A to D is a pyridine ring, the ring-fusion positions of said pyridine ring are the 2- and 3-positions when the nitrogen atom of the pyridine ring is at the 1-position, and the number of said pyridine rings is 0.2 to less than 1 as an average value, E is an ethylene group, X is a sulfo-substituted anilino group, and Y is a sulfo C1-C4 alkylamino group.

20. A porphyrazine coloring matter represented by the following formula (1') or a salt thereof:

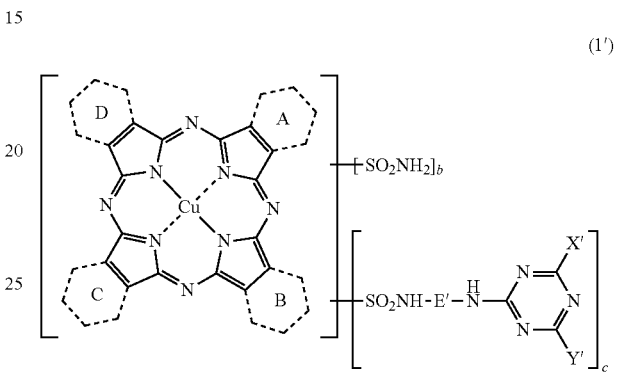

(1')

wherein:

the rings A to D each independently represent a benzene ring or a 6-membered ring nitrogen-containing heteroaromatic ring fused to the porphyrazine ring, the number of the nitrogen-containing heteroaromatic rings in the rings A to D is more than 0 and less than 1 as an average value, and the rest are benzene rings, E' represents C2-C4 alkylene, X' is a sulfo-substituted anilino group; a carboxy-substituted anilino group; or a sulfo-substituted naphthylamino group, Y' is an amino group; a hydroxy group; a mono- or dialkylamino group which may have, as a substituent, a hydroxy group, a sulfo group or a carboxy group on the alkyl group; or a 5 to 6-membered ring nitrogen-containing heterocyclic group which may have, as a substituent, a C1 to C3 alkyl group or a carboxy group, b is 0 or more and less than 3.9 as an average value, c is 0.1 or more and less than 4 as an average value, and the sum of b and c is more than 3 and less than 4 as an average value.

21. The porphyrazine coloring matter or a salt thereof according to claim 20, wherein the 6-membered ring nitrogen-containing heteroaromatic ring is a pyridine ring, X' is a sulfo-substituted anilino group, and Y' is a sulfo-substituted C1-C4 alkylamino group.

22. The porphyrazine coloring matter or a salt thereof according to claims 20 or 21, wherein:

the number of pyridine rings is 0.1 to less than 1 as an average value, and b and c fulfill the following relations:

$1.8 < b \leq 3.7,$ $0.2 \leq c \leq 1.2,$ and $3 < b+c \leq 3.9$ as an average value.

* * * * *